United States Patent [19]

Smith et al.

[11] Patent Number: 5,390,505
[45] Date of Patent: Feb. 21, 1995

[54] INDIRECT CONTACT CHILLER AIR-PRECOOLER METHOD AND APPARATUS

[75] Inventors: Glenn W. Smith, Mt. Airy; William D. McCloskey, Baltimore; Robert E. Cates, Arnold, all of Md.

[73] Assignee: Baltimore Aircoil Company, Inc., Jessup, Md.

[21] Appl. No.: 96,744

[22] Filed: Jul. 23, 1993

[51] Int. Cl.$^6$ ............................................. F25B 29/00
[52] U.S. Cl. ............................................ 62/173; 62/90; 62/95
[58] Field of Search ................ 62/95, 90, 173, 309, 62/310

[56] References Cited

U.S. PATENT DOCUMENTS 4,271,678  6/1981  Liebert ........................ 62/201 X
5,228,302  7/1993  Eiermann ...................... 62/90

FOREIGN PATENT DOCUMENTS 736108  8/1955  United Kingdom ............ 62/95

Primary Examiner—William E. Wayner
Attorney, Agent, or Firm—Edward J. Brosius; F. S. Gregorczyk; Thomas J. Schab

[57] ABSTRACT

An apparatus and method for cooling, air which apparatus includes an indirect evaporative cooler, an indirect contact chiller, a reheat coil component, an ice-thermal-storage component and an ice-manufacturing refrigeration chiller to provide alternative air-flow paths and alternative component combinations. Alternative fluid-flow paths are provided through electable combinations of the several components to effect the desired lowering of air temperature, relative humidity and air density in the cooled air.

15 Claims, 20 Drawing Sheets

INDIRECT CONTACT CHILLER AIR-PRECOOLER METHOD AND APPARATUS

BACKGROUND OF THE INVENTION

The present invention provides an inlet air pre-cooler arrangement for gas turbines and other air breathing apparatus. More specifically, a pre-cooling system with electable alternative modes is operable to reduce, below ambient air temperature, the temperature of the inlet air charged to a gas turbine; reduce or control the humidity in the inlet air to the compressor of a gas turbine; and, increase the density of the air communicated to the gas turbine compressor.

Gas turbines, which broadly include an air inlet, a compressor, a combustion chamber, turbines and an exhaust, compress incoming air flow for mixing with fuel prior to ignition of the air-fuel mixture in the combustion chambers for generation of high-temperature gasses to drive the turbine. Gas turbines are utilized for the generation of mechanical power for vehicles, such as aircraft, and are also coupled to electrical generators in the electrical power-generators in the electrical power-generating industry for the generation of electrical power, especially during peakload periods. Gas turbine usage for electrical power generation, or a gas-turbine generator, is particularly prevalent during the summer months to supplement normal power (E.g., steam or hydroelectric) generating plants for peak power demand during very hot days when air conditioning demands frequently cause increased power demand. The gas turbine generators are also used for base-load systems in smaller utilities, and for co-generation systems. However, gas-turbine-generator KW output rating or thermal efficiency is inversely proportional to the inlet air temperature to the gas turbine-generator. That is, the gas turbine-generator is less efficient with inlet air at elevated temperatures, such as 95 degrees Fahrenheit (35° C.), than it is with air at 20 degrees Fahrenheit (−7° C.), which fact has been known in the turbine industry for many years.

Various apparatus and methods have been utilized to reduce the temperature of inlet air to a gas-turbine-generator to minimize the impact or disadvantage on gas turbine generator output. However, the increased demand for electrical generator power output is frequently required at peak-use periods, such as hot summer days, during maximum power usage for cooling, which unfortunately is usually the time period with the highest ambient air temperature. Thus, the increased electric-power and the economic cost to reduce the temperature of the inlet air to the gas-turbine compressor is frequently unjustified, as the added power cost for inlet air-temperature reduction may be greater than any potential gains in gas-turbine power output. Therefore, the power-generating industry continues to seek methods and apparatus with minimal associated costs to lower inlet air temperature for gas turbines.

One frequently utilized air cooling apparatus for temperature reduction of gas-turbine inlet air is an in-line evaporative cooler ahead of the gas-turbine inlet, which acts as a direct evaporative cooling (DEC) apparatus. However, the temperature reduction from this DEC apparatus may only be approximately 85% of the dry-bulb/we-bulb temperature differential. More importantly, the DEC apparatus cannot produce any significant benefit unless ambient relative humidity is well below 75%, and preferably between about 20% to 60%.

As an example, ambient air with a dry-bulb temperature of about 95 degrees Fahrenheit (35° C.) and wet bulb temperature of about 78 degrees Fahrenheit (25° C.) may only be depressed to a dry bulb temperature of about 80.5 degrees Fahrenheit (27° C.). In addition, the relative humidity of this reduced-temperature air may be in excess of 90% (percent) or, in fact, may be, during sudden weather changes, water-saturated with entrained water particles, which particles may impinge and abrade or otherwise damage the turbine blades.

Although chilled or cooled gas turbine inlet air is preferred and, as noted above, aids in an increase of the gas turbine-generator capacity, the selection of a specific chilled air temperature impacts upon the output capacity of the gas turbine-generator. The temperature of the turbine compressor inlet air must be above 32 degrees Fahrenheit (0° C.) to prevent ice buildup on the compressor blades, as the chilled inlet air may be at 100% relative humidity or have entrained moisture carry-over from the air-chilling process. Further, the rapid increase in air velocity in the compressor inlet results in a static pressure drop in the air of as much as 4 inches of water, which may result in a further temperature drop and moisture condensation. Thus, it may be desirable and more advantageous to have the chilled inlet air at about 45 degrees Fahrenheit (7° C.) and about 85% relative humidity, which more readily accommodates variations in the air temperature and humidity while preserving the improved operational integrity of the gas turbine with the chilled air. The relative options and benefits of inlet air chilling for gas turbine utilization are discussed in the article "Options in Gas Turbine Power Augmentation Using Inlet Air Chilling", which paper was presented at the 1990 Gas Turbine and Aeroengine Congress and Exposition in Brussels, Belgium.

A cooling tower is a familiar structure associated with cooling apparatus, which cooling tower is generally a fluid (e.g. water) recirculating arrangement acting to reject heat to the atmosphere. The cooling tower usually has a heat exchange apparatus in its fluid circuit with the fluid recirculated through the heat exchanger by a pump for return to the cooling tower and gravity feeding over a heat-exchange media. The recirculating cooling tower and heat exchanger arrangement adds both heat and water vapor to the air transferred therethrough and generally requires a makeup water system as a great deal of cooling fluid will evaporate.

In a direct evaporative cooling system, which is an air cooling and humidification device circulating air over direct heat exchange air-to-water media such as an air washer, cooling and humidification generally occur when air is passed through a continuously recirculating cold water spray. This is a constant enthalpy process, as any evaporation requires heat to be withdrawn from the air (i.e., a temperature drop), and the recirculating water temperature is concomitantly reduced to the wet bulb temperature of the incoming air. After a period of time, except for slight pump-energy heating, the recirculating water attains approximately the wet-bulb temperature of the air through a purely evaporative means. The evaporative cooler does not utilize a heat exchanger, as opposed to a cooling tower, and discharges air, which is reduced in dry-bulb temperature, is essentially moisture saturated, and typically has a relative humidity above 90%. However, moisture in the cool air transferred to another apparatus from the evaporative cooler should be kept from freezing when the air temperature drops and, therefore, the entering wet bulb temperature should be kept well above 32 degrees Fahrenheit (0° C.), such as 40 degrees Fahrenheit (4.5° C.) minimum. Even though evaporative coolers cannot produce cold air exhaust on warm days, the air discharged from the direct evaporative cooling system will be cold, on a cold ambient day, and it may be necessary to reheat the air before sending the moisture saturated air to a gas turbine inlet, which reheating controls the humidity and allows further evaporation of any water droplets in order to inhibit moisture freezing on the downstream apparatus.

Reducing the temperature of the cooling fluid in a DEC apparatus below the entering-air wet-bulb temperature, such as by ice-water in a separate structure, can further decrease the discharged-air temperature below the ambient-air, wet-bulb temperature. When the indirect contact chiller (ICC) discharge water temperature falls below the entering air dew-point, this results in both an air temperature decrease below the wet-bulb temperature and de-humidification. The final temperature of discharged water will depend upon external heat removal and water quantity transferred through the air washer, but when the air dry-bulb temperature is depressed below ambient dew-point conditions, some moisture will condense from the air. Thus, depression of the coolant fluid (usually water) temperature in an indirect contact chiller to a temperature well below the dew-point can depress below the dew-point both the wet-bulb and dry-bulb temperatures of the air flowing through the ICC apparatus. Ambient air parameters such as wind velocity, temperature and humidity can fluctuate rapidly as weather patterns change, which can affect the heat transfer characteristics of an indirect contact chiller causing excessive chilling of the discharge air, perhaps to 35 degrees Fahrenheit (2° C.) or lower, which could lead to freezing deposits at the lower pressure region of a turbine inlet cone, for example. Thus, auxiliary equipment may be required to provide discharge air to a gas-turbine inlet at an assured-minimum controlled temperature and assured-minimum relative humidity.

Although it is known that chilling the inlet air for use in a gas turbine will enhance the efficiency and operation of the gas turbine, the chilled inlet air has to be provided controllably, efficiently, economically and without adding unwanted auxiliary power consumption during peak load operations. The preferred turbine inlet air "quality" is dependent upon the differential between the ambient air wet and dry bulb temperatures, as well as the desired inlet air relative humidity, the barometric pressure and the overall change in air density. All of these parameters reflect the character of the reduced temperature air and impact on the operation of the gas turbine. Therefore, it is necessary to consider all of these parameters when providing a mass flow rate of air at a reduced temperature to a gas turbine.

The precise characterization or desired air temperature and/or humidity or air conditions are noted in a psychometric chart, which provides semi-empirical relations giving the air thermo-psychrometer readings. The psychrometer is an instrument for measurement of the wet and dry-bulb temperatures of air. Psychrometric charts are nomograms constructed to provide convenient determinations of the properties of air-water vapor mixtures, such as humidity, dew-point, enthalpy, specific volume and water-vapor pressure as functions of barometric pressure and temperatures obtained with a psychrometer. Thus, a design inlet air temperature of 45 degrees Fahrenheit (7° C.) and 85% relative humidity for a gas turbine in the example provides a reasonable operating temperature at an acceptable relative humidity with minimal concern for potential ice buildup on turbine blades while accommodating unexpected weather variations. Control of the inlet air mixture is not always accommodated by use of an indirect contact apparatus or cooling tower, as the air communicated through the tower may be reduced in temperature to approximately the wet-bulb temperature of the ambient air. It is also desirable to control the humidity of the turbine inlet air to minimize the potential for transfer of entrained water droplets to the turbine inlet.

In an article, "Advances in Technology With Potential for Air Conditioning and Refrigeration" by Raymond Cohen, an alternative gas turbine air enhancement arrangement is provided by a system, which uses finned-tube closed-circuit cooling coils cooled by a glycol/water solution from an off-peak ice freezing system, using the same fluid for off-peak freezing of ice. Air is communicated past these cooling coils to reduce its temperature from a nominal reference temperature of 90 degrees Fahrenheit (32° C.) to approximately 60 degrees Fahrenheit (16° C.) for injection or communication to a gas turbine coupled to a generator for producing electric power. An off-peak-operable ice chilling system manufactures and stores ice during electrical power off-peak hours. The stored ice is utilized to reduce the cooling fluid temperature in the cooling coils during turbine usage for reducing the inlet air temperature communicated to the gas turbine. However, the system has no provision for control of the relative humidity, requires a high external static loss type of fincoil heat exchange, and terminal temperature difference associated therewith, and the reduction in air temperature is limited by the single stage operation of the system without flexibility for other operating modes.

U.S. Pat. No. 4,137,058 to Schlom et al. provides an indirect evaporative heat exchanger with walls having wet and dry sides for cooling a gas for a turbine compressor. The heat exchanger provides a cool dry air stream and a cool moist air stream on either side of these walls for communication to a power turbine compressor inlet and intercooler. In alternative embodiments, indirect evaporative cooling units are connected in series to combine cool dry air from the second indirect evaporative cooler is combined with the cool moist air from the first indirect evaporative unit, which units are utilized for a two-stage gas compression system intercooler. The resultant cool dry air is used as inlet air to the gas turbine air compressor. In a third embodiment, the dry cool air stream and a moist cool air stream emitted from the indirect evaporative cooler are combined and transferred for use as an inlet air stream to the turbine air compressor, however, no cool air is provided to the intercooler in this disclosed embodiment.

In a final embodiment, the dry cool air stream from the indirect evaporative cooler is used as an inlet air stream for the wet side of the indirect evaporative cooler and the resultant, supposedly very cool moist air is then utilized as an inlet air charge for the turbine air compressor.

The known air-cooling apparatus, which include mechanical chillers, evaporative air coolers and absorption chillers, may provide a cool, or cooler than ambient, inlet air temperature to a gas turbine to enhance its efficiency and operating performance. However, no consideration has been given to control of entrained moisture droplet elimination, air density, relative humidity at a specific temperature in the inlet air volume, or off-peak thermal storage ice manufacture and harvest, which ice provides on-peak operations without the electrical energy demand of refrigeration compressor on-line. Further, they are a much greater first cost, are less economically operable and frequently put an added electrical burden on gas turbines coupled to electrical generators.

The present air-cooling apparatus provides an indirect contact chiller with the flexibility for alternative operational modes. It is also operable in cooperation with ancillary air-treatment structure to pre-cool and control discharge air temperature and humidity. More particularly, this apparatus is coupled to a gas-turbine to provide it with reduced temperature air without the necessity to provide and operate a full-sized vapor-compression system with an expensive compressor during peak-load hours. The gas-turbine is connectable to an electrical generator.

In an ideal condition, an air precooling system for a gas turbine would provide inlet air to the gas turbine with the maximum increase in air density and control of the inlet air properties, such as temperature and relative humidity. The precooling system would be operable in various modes to control the properties of the inlet air while minimizing the operating costs and matching operating conditions to existing weather and generating load variances. In the case of a gas turbine coupled to an electrical generator, such generators are frequently utilized to supplement normal generating capacity from hydropower, nuclear power, on-line fossil-fuel combustion or other generating means. A thermal storage apparatus in cooperation with an indirect contact chiller, an indirect evaporative cooler and a reheating apparatus can provide chilled air at a reduced temperature and controlled relative humidity at a nominal cost by utilizing off-peak operations to generate a cold mass for reducing coolant temperature for reaction with warm ambient air during any demand period, which is generally a peak or high demand period for gas-turbine generators. This provides a system that can incorporate relatively smaller systems to provide the cold mass, which is usually ice, as it is developed over a long-term such as 12 to 16 hours for reaction with the coolant for a short term during precooling system operation. The economics of the thermal storage system are enhanced by the increased turbine KW output and the increase in turbine efficiency and may be compared to the utility provided incentives to certain customers, primarily for commercial HVAC (heating, ventilating and air-conditioning) operations, to reduce electrical consumption during high-load or peak-load periods. Indicative of these peak load periods are the extremely high mid-afternoon temperatures in the summer months, which in some locales result in "brownouts". In this brownout condition, local utilities resort to purchasing power from other generating plants, if it is available, or operating on reduced voltage outputs or other methods to utilize available power in these high-load period. Consequently, it is quite evident that utilizing scarce and more expensive power during a high-load period to reduce the turbine air inlet temperature is not economically reasonable. Further, it can be demonstrated that it is possible to continuously utilize a thermal storage system at a controlled rate to reduce turbine inlet air temperature.

An unobvious benefit from the reduction of the air temperature below the dew-point is the recovery of the condensate moisture, which is essentially demineralized water, for utilization by injection into gas turbine combustion zones in the control of nitrogen oxide emissions.

SUMMARY OF THE INVENTION

The present invention provides an air pre-chilling system for reducing discharge air temperature below ambient air temperature, controlling the relative humidity of the discharge air, concomitantly increasing air density and generally controlling entrained moisture or water droplets. The pre-cooling apparatus has alternative air flow paths to accommodate variations in the ambient air conditions, as well as, making alternative inlet air treatment modes or characteristics available to the user. The desired inlet-air characteristics are provided by utilization of the individual cooling and air transfer capabilities of the components within the system, which components are capable of varying the discharge air temperature, relative humidity, and, consequently, the density of the air. In a particular embodiment, provision may be made for the alternate utilization of a single cooling tower and heat transfer cycle on a diurnal cycle to serve more than one component to minimize the structural requirements of the apparatus. The air pre-chilling system is operable to reduce air temperature and humidity for ambient air up to 100% relative humidity.

More specifically, a diurnal or a weekly system uses an off-peak ice making chiller plant (IMP), for reducing the temperature of ice-water coolant fluid and freezing ice, storing ice and then reheating ice for an indirect-contact heat and mass exchanging, ice-water-fed heat transfer media, which may be serially arranged in the air stream flow with an indirect evaporative air cooler having a cooling tower and finned coil bank, and a reheating coil-bank for production of relatively low cost, reduced-temperature and humidity inlet air for an air-consuming device, such as a gas-turbine. Ice chilling and storage provide the availability of reduced-temperature coolant fluid, or ice-water for reduction of the inlet air temperature to a gas turbine below the temperature attainable by mere recirculation of a coolant fluid, which is limited by the ambient air temperature.

BRIEF DESCRIPTION OF THE DRAWINGS

In the figures of the drawings, like reference numerals identify like components, and in the drawings.

DETAILED DESCRIPTION OF THE INVENTION

Figure 14:
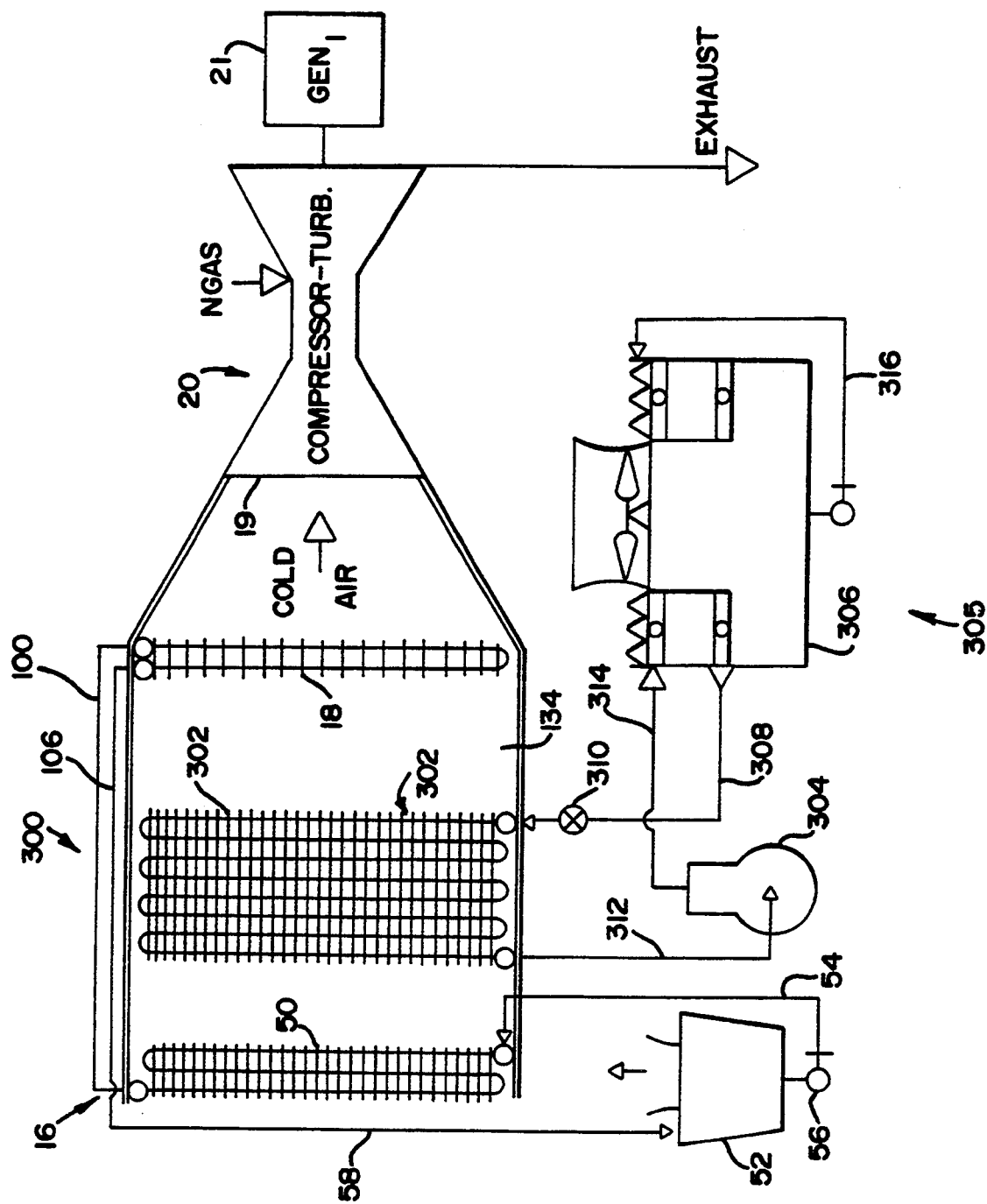
FIG. 14 schematically illustrates the basic configuration of the present invention utilizing an indirect contact chiller to reduce the inlet air temperature to a turbine-generator.

An air chilling system 300 to provide reduced temperature air to an air consuming apparatus, such as gas turbine 20, is diagramatically illustrated in FIG. 14. Although system 300 is operable with any apparatus, such as an air-breathing engine or heat exchanger, or large capacity air conditioning system, the structure and operation of system 300 will be described with particular reference to gas turbine 20, which is coupled to generator 21. As noted in U.S. Pat. No. 5,193,352, which is incorporated by reference herein, this coupled turbine-generator arrangement is not uncommon in the power generating industry and is frequently utilized as a rapidly actuable power generating assembly at periods of increased or peak demand, as well as representing the only power generating construction for certain utilities.

Figure 10:
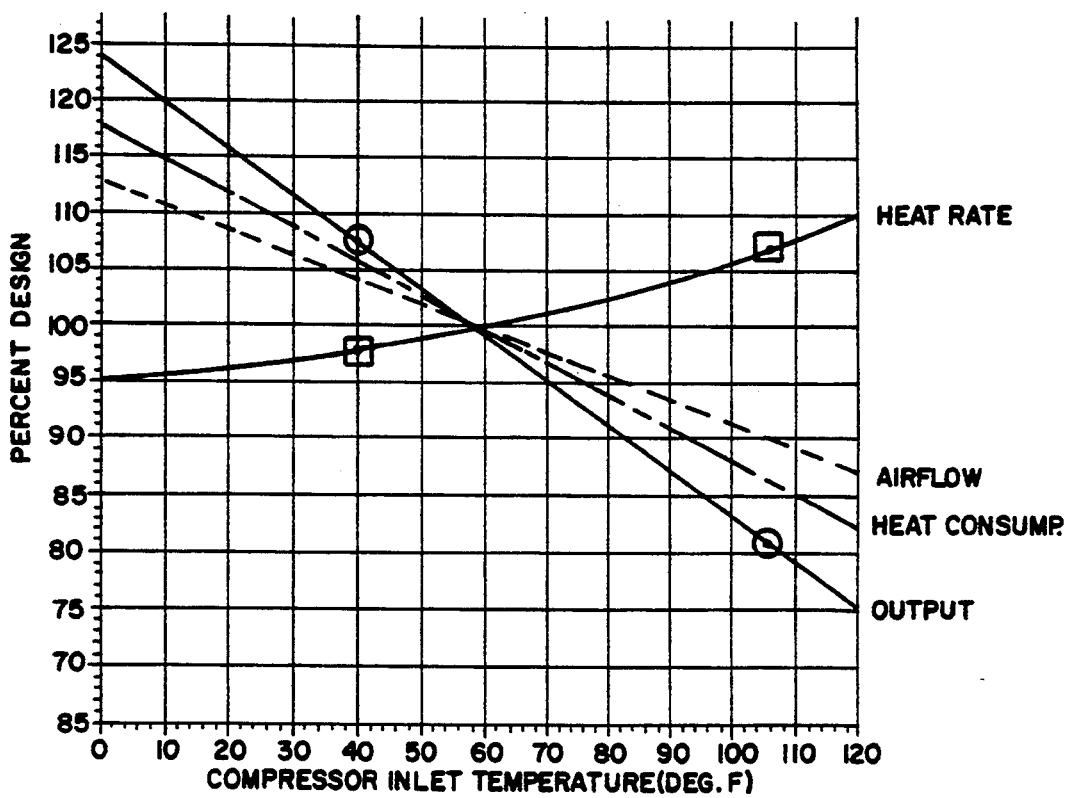

Provision of reduced temperature or increased density air rather than ambient air to a gas turbine-generator generally provides an increase in turbine efficiency and output capacity or generator KW. The improvement in turbine-generator efficiency is illustrated in FIG. 10 therein, which shows percentage change from design capability as a function of compressor (turbine) inlet temperature for the variables of heat rate, air flow, heat consumption. It is clearly evident that with a lowering of inlet air temperature, the gas turbine-generator power output increases as the heat rate decreases. As an example, a change in inlet air temperature from about 105° F. to about 40° F. will reduce the heat rate about 9%, but it will improve the output by approximately 35%. The efficiency of the turbine 20 and generator 21 arrangement is improved whenever heat rate decreases or when the kilowatt output increases at the same operating conditions.

Figure 3:
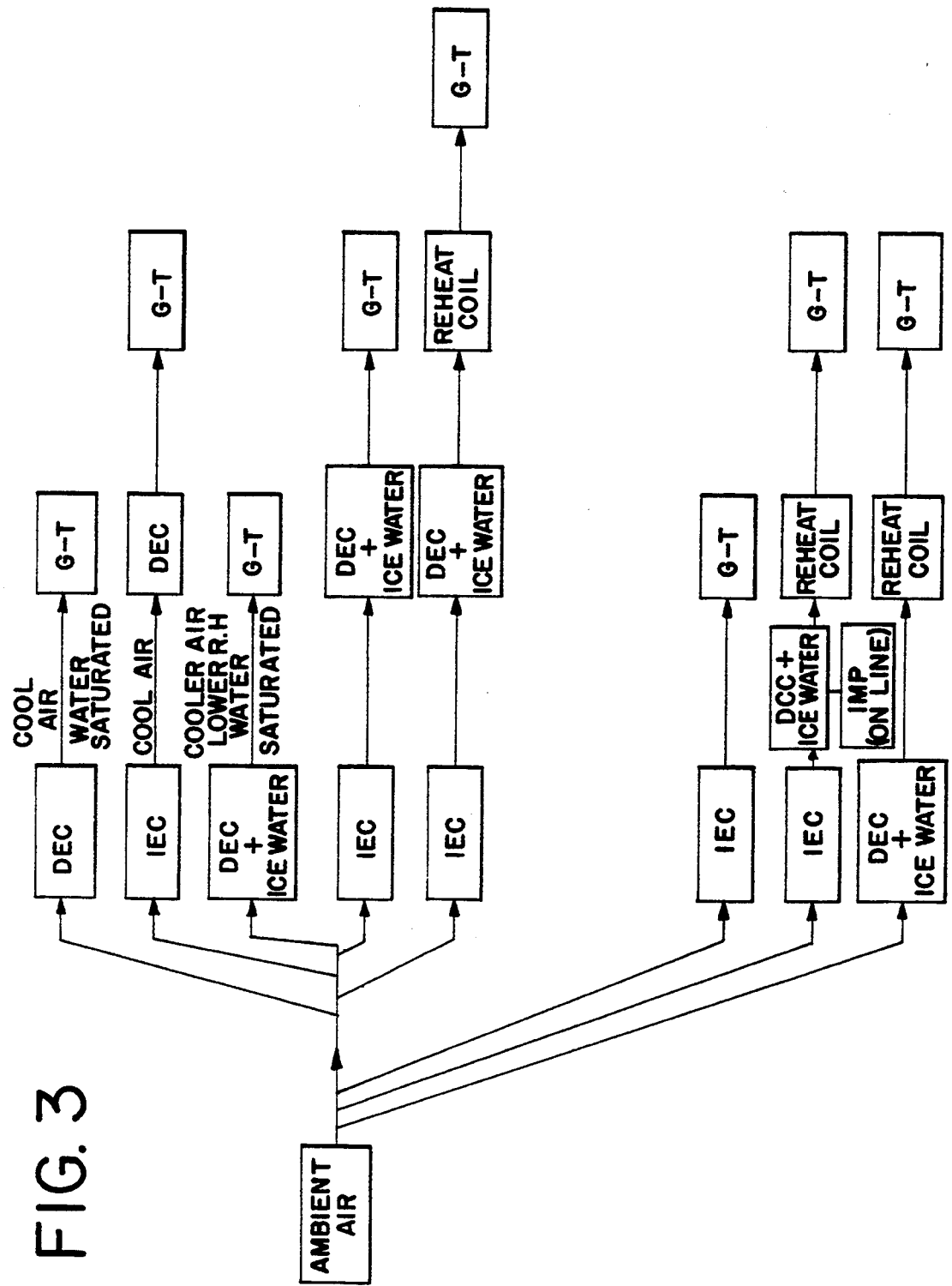
FIG. 3 illustrates some alternative cooling flow paths of ambient air through the multicomponent system of FIG. 1.
Figure 4:
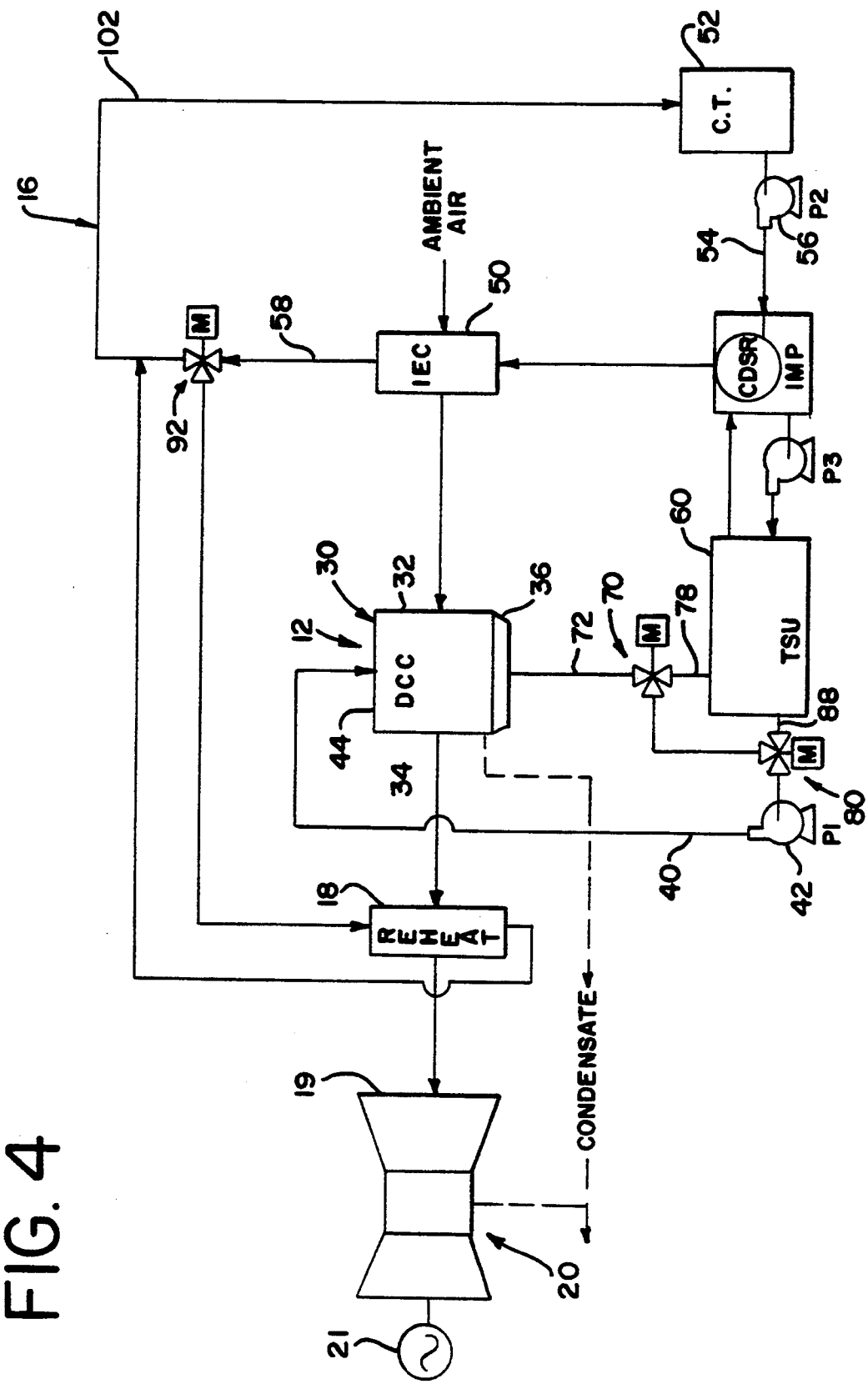
FIG. 4 illustrates a first operating mode of the system of FIG. 1.

In the preferred embodiment teaching of the above-cited Smith et al.—U.S. Pat. No. 5,193,352, air cooling system 10 for gas turbine 20 has a direct-contact chiller, DCC, 12 coupled to an ice-chilling assembly 14, an indirect evaporative cooling (IEC) apparatus 16, and an outlet air humidity-controlling reheating coil 18. Each of DCC 12 and IEC 16 are independently operable to cool the inlet air to gas-turbine 20 below ambient air temperature and, these components may operate either separately or in conjunction with each other and any of ice-chiller 14 and coil 18 for enhanced inlet-air humidity control or temperature reduction. Several potential operational sequences for system 10 are illustrated in FIG. 3, but these are merely illustrative and were not a limitation to the invention of that disclosure. In the illustrated embodiment of FIG. 1, the arrangement, placement and order of the components are shown in an aligned linear relation, however, the physical arrangement for communication of air flow past or through an individual component, element of sequence of elements may be accommodated by dampers, ducts, conduits, baffles or other known physical air transfer devices to provide a selected operational mode and physical component assembly. A similar stricture is applicable to the disclosure of the present invention. Although the figures of this Smith et al.—'352 patent are provided herein for reference, the present invention is illustrated and discussed particularly with reference to FIGS. 14–21.

In a first embodiment of the present invention, as diagramatically shown in FIG. 14, air cooling system 300 is coupled to compressor 20 at air inlet 19. Air cooling system 300 has indirect-contact chiller (ICC) 302 coupled to a cooling apparatus or assembly 305, an indirect-evaporative chiller (IEC) 16 and an outlet air humidity-controlling reheating coil 18. Each of IEC 16, reheat coil and ICC 302 is independently operable to cool the inlet air to gas-turbine 20 below ambient air temperature and, these components may operate either separately or in conjunction with each other and any of ice chiller coil 302 reheating coil 18 for enhanced inlet-air humidity control or temperature reduction. Several operational or alternative arrangements are shown in the FIGS. 14–21. In the illustrated embodiments of these figures, the physical arrangement for communication of air flow past or through an individual component, element or sequence of elements may be accommodated by dampers, ducts, conduits, baffles or other known physical air transfer devices to provide a selected operational mode and physical component assembly.

In the figures, ICC 302 is operable to cool ambient air communicable to turbine air inlet 19. As an example of the ICC cooling arrangement, ambient air with a first dry-bulb temperature and first absolute humidity is directed through the illustrated fin and coil arrangement of ICC 302, which is the fluid flow path for the cooling fluid. Air is discharged through the fin and coil arrangement at its discharge side 134 for transfer to the gas turbine air inlet 19 at a second and lower dry-bulb temperature and absolute humidity. A sump or pan 136, which is shown in FIGS. 16–21, receives condensate accumulating on the fin and coil arrangement from the dehumidification process. This condensate may be discharged to a drain, a storage tank, a cooling tower 52 for use as demineralized water, or to any other disposal or reclamation arrangement, however, this disposal is not a part of the present invention. A first cooling fluid, such as a dual phase refrigerant fluid, is operable in the ICC fin and coil arrangement of the embodiment of FIG. 14, which embodiment utilizes the ICC arrangement in a manner associated with a fundamental refrigeration type fluid circuit 305. In this illustration, which is utilized to demonstrate the basic operating steps of the invention without limiting its scope, a compressed and condensed refrigeration fluid is communicated from evaporative condenser 306 through conduit 308 to thermal expansion valve 310. Valve 310 is actuable in an automatic manner and its operation is known in the art. As the compressed and condensed refrigerant or first cooling fluid courses through the coil of ICC 302 it expands, its pressure decreases and its temperature increases. This expanded refrigerant is generally a gaseous component and is communicated through conduit 312 from ICC 302 to compressor 304, which increases the pressure and discharges a high-pressure refrigerant to condenser 306 through conduit 314 wherein the high pressure refrigerant material is condensed to a generally liquid material for recirculation to ICC 302. In this manner, compressor 304 also acts as a pump. Evaporative condenser 306 appears similar to a cooling tower and includes a recirculating pump, sump and conduit 316 for conducting the cooling tower coolant fluid to provide heat transfer of the compressed refrigerant in a known operating manner.

In FIG. 14, various added operational steps are noted at turbine 20, which include the possible introduction of nitrogen gas ahead of the combustion zone of turbine 20 to further reduce the temperature of the air and increase its density thus making it possible to provide a greater volume of air for more complete combustion of the fuel charged to the compressor. However, this is not a part of the invention and it is generally considered to be an expensive action to increase the power output of a fuel-burning device. The exhaust products from the turbine are illustrated as being discharged from the turbine without consideration of their specific treatment.

Figure 15:
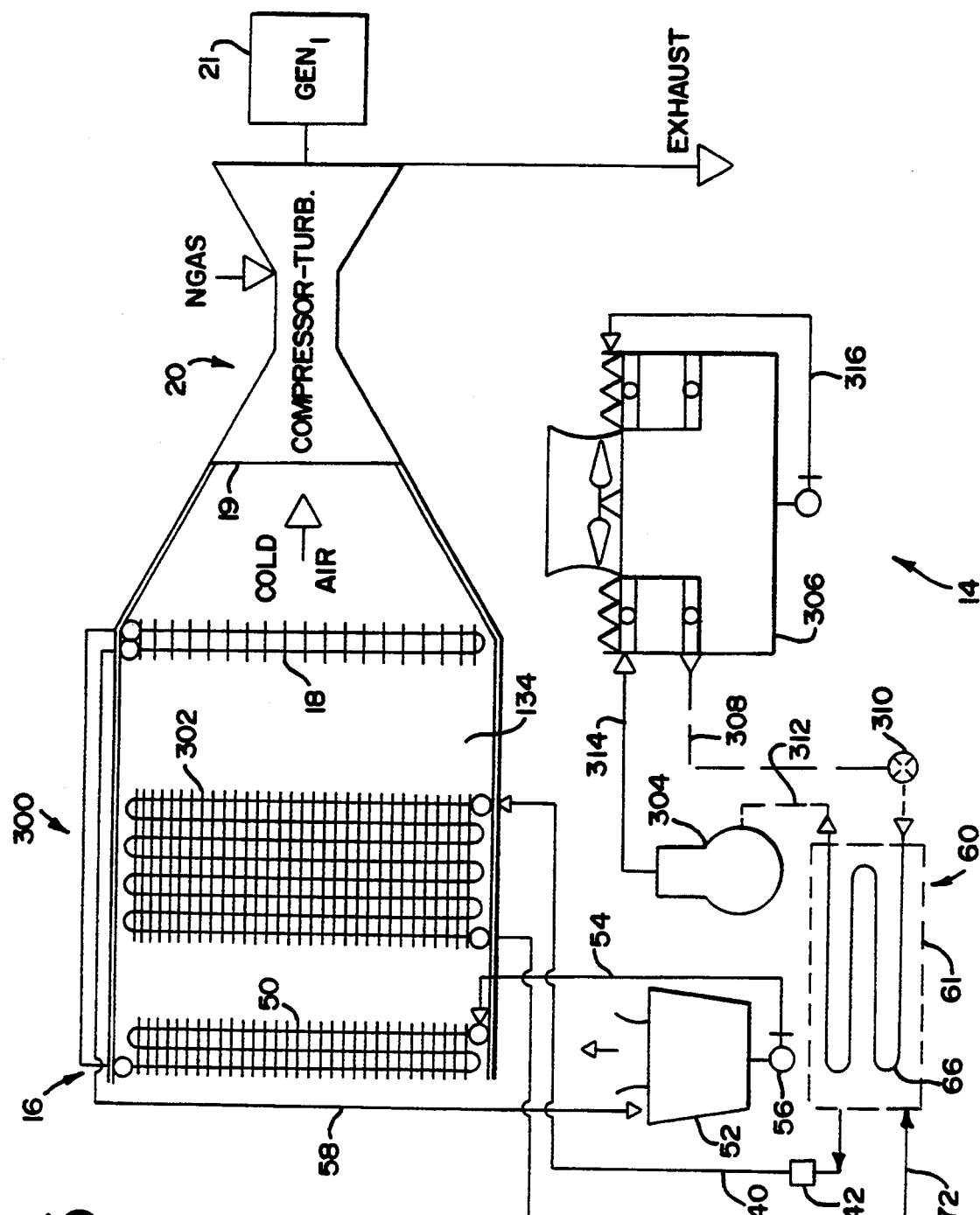
FIG. 15 is an alternative embodiment of the arrangement shown in FIG. 14.

In FIG. 15, the structure and operation of system 300 is similar to the apparatus taught and shown in FIG. 14, however, a thermal storage unit (TSU) 60 is now provided in the refrigeration fluid circuit. In an exemplary TSU, an apparatus, tank or housing 61 may have a storage media, such as a volume of water therein. A coil 66, illustrated as a serpentine arrangement in tank 61, is connected to TXV 310 to receive the compressed and condensed refrigerant fluid to freeze or chill at least some of the water in housing 61 and return the warmed refrigerant to compressor 304 for recirculation through the refrigeration circuit. The chilled fluid, such as water, may then be circulated by pump 42 through conduit 40 to ICC 302 for cooling the air in system 300. The warmed fluid is returned to housing 61 through return conduit 72. In this embodiment, the compressor-condenser refrigeration circuit 14 may be operated during the non-peak usage hours to chill or freeze the fluid in tank 61, which would utilize less expensive fuel or energy costs. Thereafter system 300 could utilize the stored cooling capacity at the peak cost hours to cool the air to generate peak-demand power effectively utilizing non-peak energy, by operating ICC 302 with the chilled/frozen fluid media.

Figure 16:
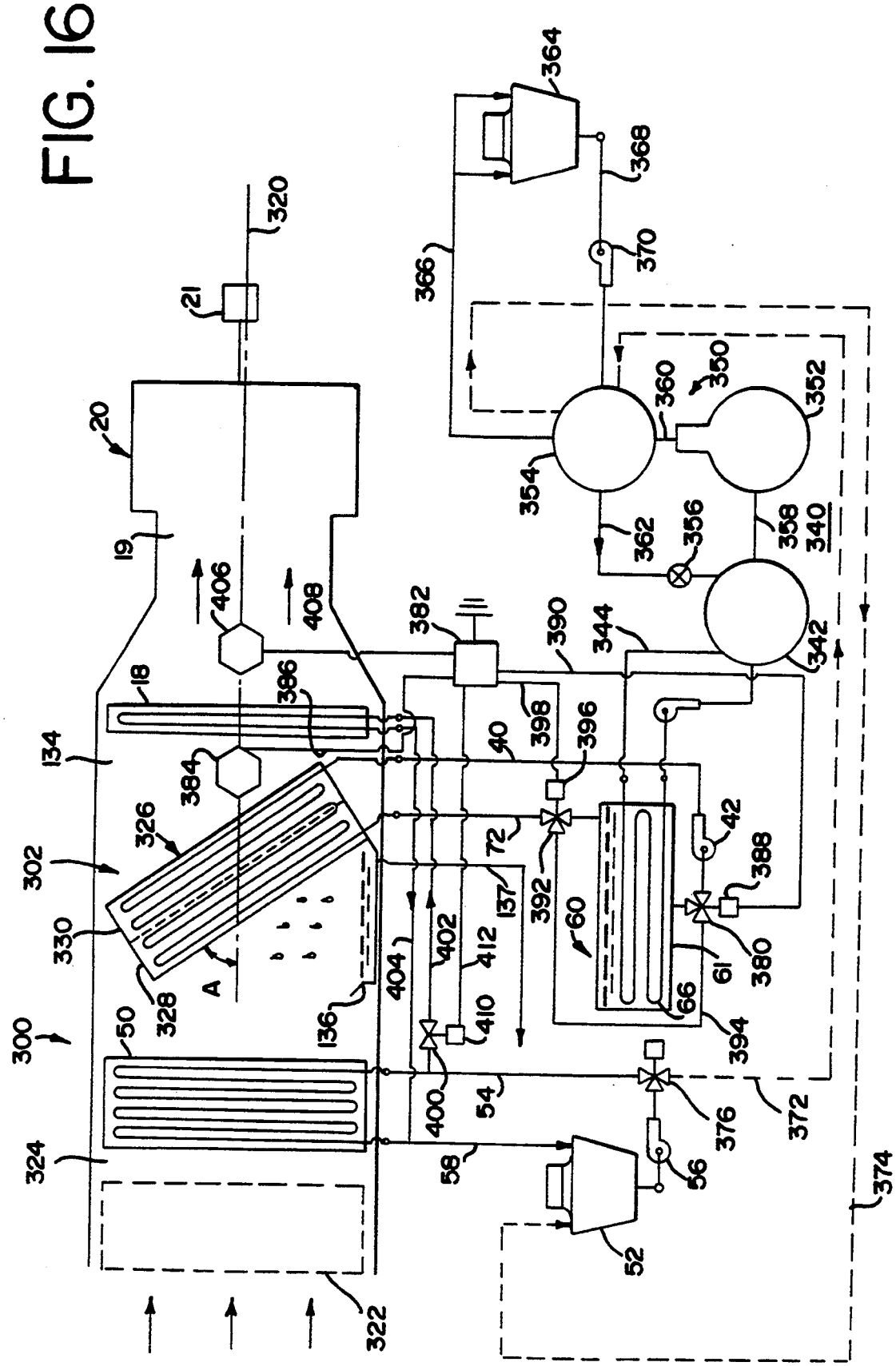
FIG. 16 is a diagrammatic illustration of an alternative embodiment of the present invention.

In FIG. 16, a more detailed illustration of an alternative embodiment includes ICC 302 mounted at an acute angle to longitudinal axis 320. In this arrangement, optional pre-filters 322 are noted at air inlet 324 ahead of IEC 50, which is operable in a manner as described above and in the Smith et al.—'352 patent. The reduced-temperature air from IEC 50 is communicated to ICC 302, which is a fin and coil arrangement provided at the acute angle 'A'. In this illustration, the fin and coil arrangement 326 has a first and lighter shaded area 328 and a darker shaded and downstream area 330. In an upright position these areas 328 and 330 would approximately be separated by a vertical axis. At this inclined arrangement moisture condensing on the downstream area 330 from the dehumidification process is expected to flow to the lighter upstream area 328 for collection in sump or pan 136 and discharge through line 137 to any of a sump, drain or recycle arrangement. As this moisture flows over the fins and coils of area 328 it is expected to assist in the cooling and heat transfer of the air passing through the upstream coil area. Thereafter, the cooled and dehumidified air is transferred to reheat coil 18 and turbine inlet 19 as noted above.

In FIG. 16, ICC 302 is illustrated as coupled to TSU 60, which is coupled to a glycol cooling apparatus 340 for chilling the cooling media in TSU 60. In this figure, a glycol chiller 342 is coupled by conduit 344 to cooling coil 66 in tank 61 to provide a coolant fluid for chilling and freezing the media therein. Glycol chiller 342 is itself connected to a refrigeration circuit and apparatus 350, which has compressor 352, condenser 354 and TXV 356 to provide a cool refrigerant to glycol chiller 342. In this arrangement, warmed refrigerant from chiller 342 is conducted to compressor 352 by conduit 358 for compression and downstream transfer to condenser 354 through conduit 360. The condensed refrigerant is communicated to TXV 356 through line 362 and thus to chiller 342. As noted in this figure condenser 354 is connected to cooling tower 364 by lines 366 and 368 with a recirculating pump 370 in this fluid flow circuit to provide a coolant liquid such as water to condenser 354. Condenser 354 is similarly coupled to cooling tower 52 through conduits 372 and 374 with three-way valve 376 connecting conduits 54 and 372 to direct flow of cooled fluid to one of condenser 354 and IEC 50. In this latter arrangement, it is only necessary to utilize cooling tower 364 if the compressor 352 is utilized during the operation of cooling system 300 during on-peak periods.

In this arrangement of FIG. 16, chilled or frozen media from tank 61 and TSU 60 is communicated to ICC 302 through conduit 40 and returned to tank 61 through line 72. However, in this embodiment, first three-way valve 380 is coupled between tank 61 and pump 42 and is operable to communicate chilled fluid to pump 42 in response to a signal from first temperature sensor 384 downstream of ICC 302, which communicates a signal through line 386 to controller 382 for actuating servomechanism 388 through line 390 and thus valve 380. Second three-way valve 392 is mounted in return conduit 72 and, connected to tank 61 and first three-way valve 380 by line 394. Servomechanism 396 of valve 392 is coupled to controller 382 by line 398 and operable to control flow in response to a signal from sensor 384.

Two-way valve 400 is connected between delivery conduit 54 and reheat-coil delivery conduit 402 and operable to provide coolant fluid to coil 18 in response to a signal from second temperature sensor 406 downstream of coil 18, which sensor is connected to controller 382 by line 408. A control signal is provided to servomechanism 410 by line 412 from controller 382 to actuate fluid delivery to coil 18. Fluid is returned to conduit 58 by connecting line 414 for return to cooling tower 52.

Figure 17:
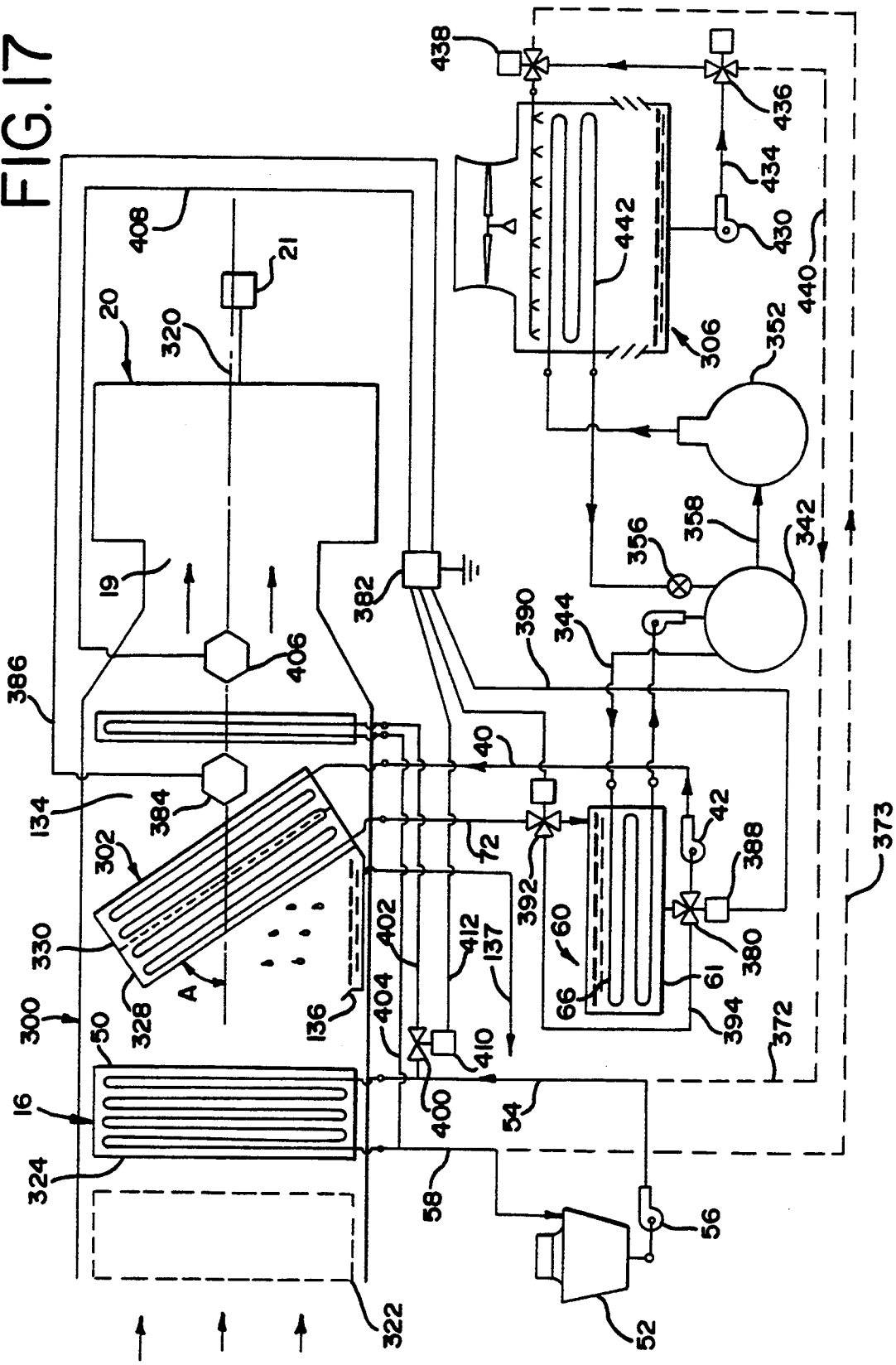
FIG. 17 is an alternative embodiment of the apparatus of the present invention.

In FIG. 17, an alternative embodiment of the more detailed structure disclosed in FIG. 16 utilizes an evaporative condenser 306 as an alternative to condenser 354 and cooling tower 364 arrangement of FIG. 16. In this alternative embodiment, it is specifically noted that the use of cooling tower 52 can be obviated by the use of evaporative condenser 306 during the peak usage period with compressor 352 deactivated. In this embodiment, pump 430 is coupled to recirculate cooling fluid from the sump of condenser tower 432 to the top of the tower through conduit 434. Three-way valve 436 is positioned in conduit 434 and operable to divert fluid flow from pump 430 to one of second three-way valve 438 and IEC delivery conduit 440 for communication to IEC 50. Second valve 438 is operable to receive fluid from pump 430 and valve 436, as well as to receive warmed fluid from IEC 50 for transfer over coils 442 in condenser 306. It is noted that valves 436 and 438 are both servomechanism operable but are not shown as coupled to controller 382. The choice of operation, actuation and connection is a design choice. In operation, the cooling circuit arrangement noted in FIG. 17 is operable to act as a cooling tower in those periods where compressor 342 is deactivated. Therefore, cooling tower 52 may be omitted but is shown in the figure as an emergency apparatus available in the event of malfunction of evaporative condenser.

Figure 18:
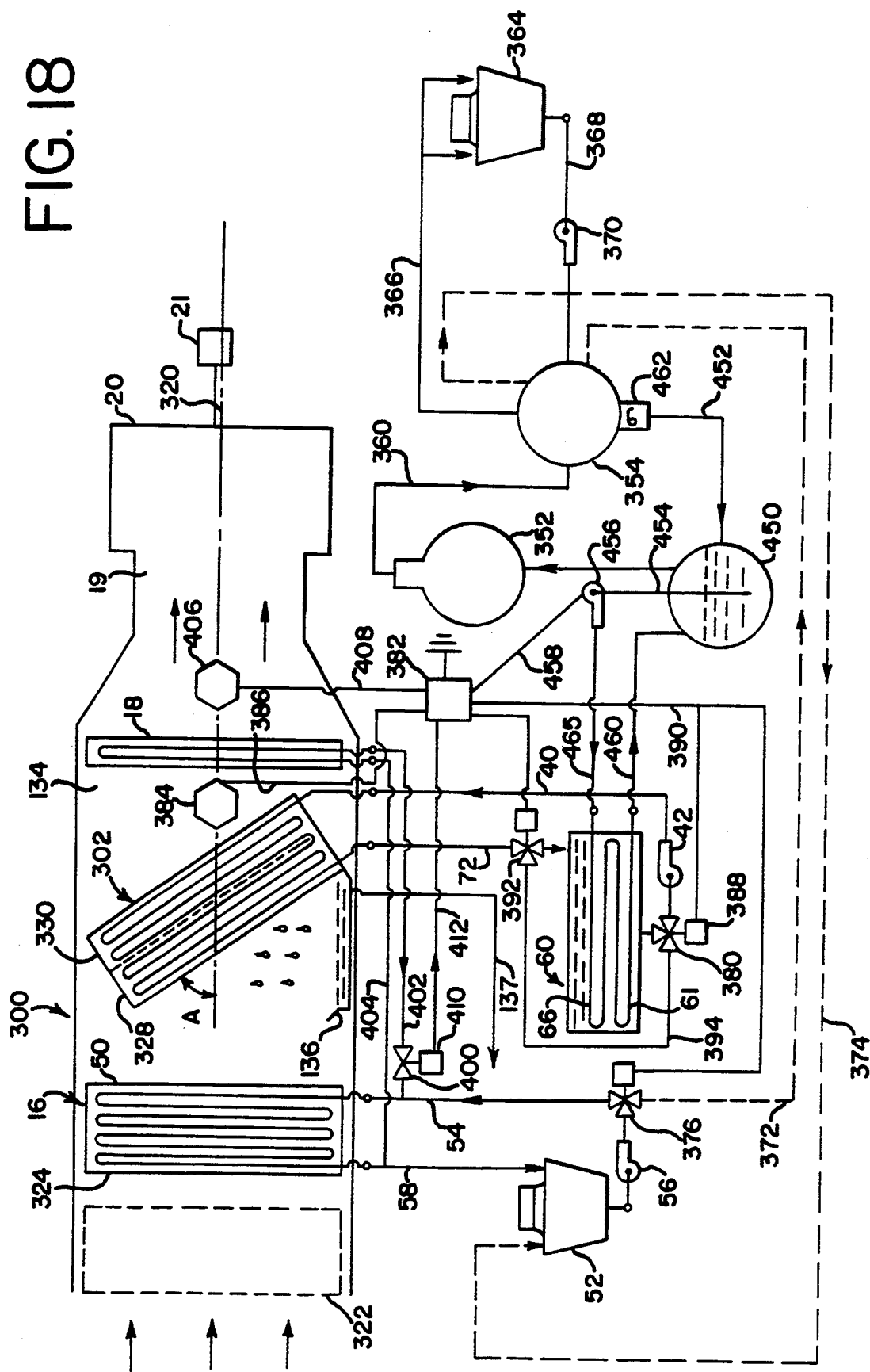
FIG. 18 is another embodiment of the apparatus and arrangement of the present invention.

Another embodiment is illustrated in FIG. 18 with an alternative refrigerant supply circuit providing the chilling and freezing refrigerant to coils 66 in TSU 60. In this embodiment, condenser 354 is coupled to cooling tower 364 and communicates liquid refrigerant to a receiver 450 through conduit 452 for communication to coils 66 by line 454, 455 and pump 456, which is connected to and actuable by controller 382 through line 458. Return line 460 transfers warmed refrigerant fluid, which may be gaseous, to receiver 450 from coil 66. Condenser 354 includes a float 462 ahead of conduit 452 to provide a demand and pressure drop function switch for communication of condensed refrigerant to low-pressure receiver 450. In this embodiment, it is noted that IEC cooling tower 52 may be utilized as an alternative to cooling tower 364 for rejecting waste heat from condenser 354 during those periods of inoperation of compressor 352. However, election of this alternative is a design choice and may be dependent upon the operation cycle of compressor 352.

Figure 19:
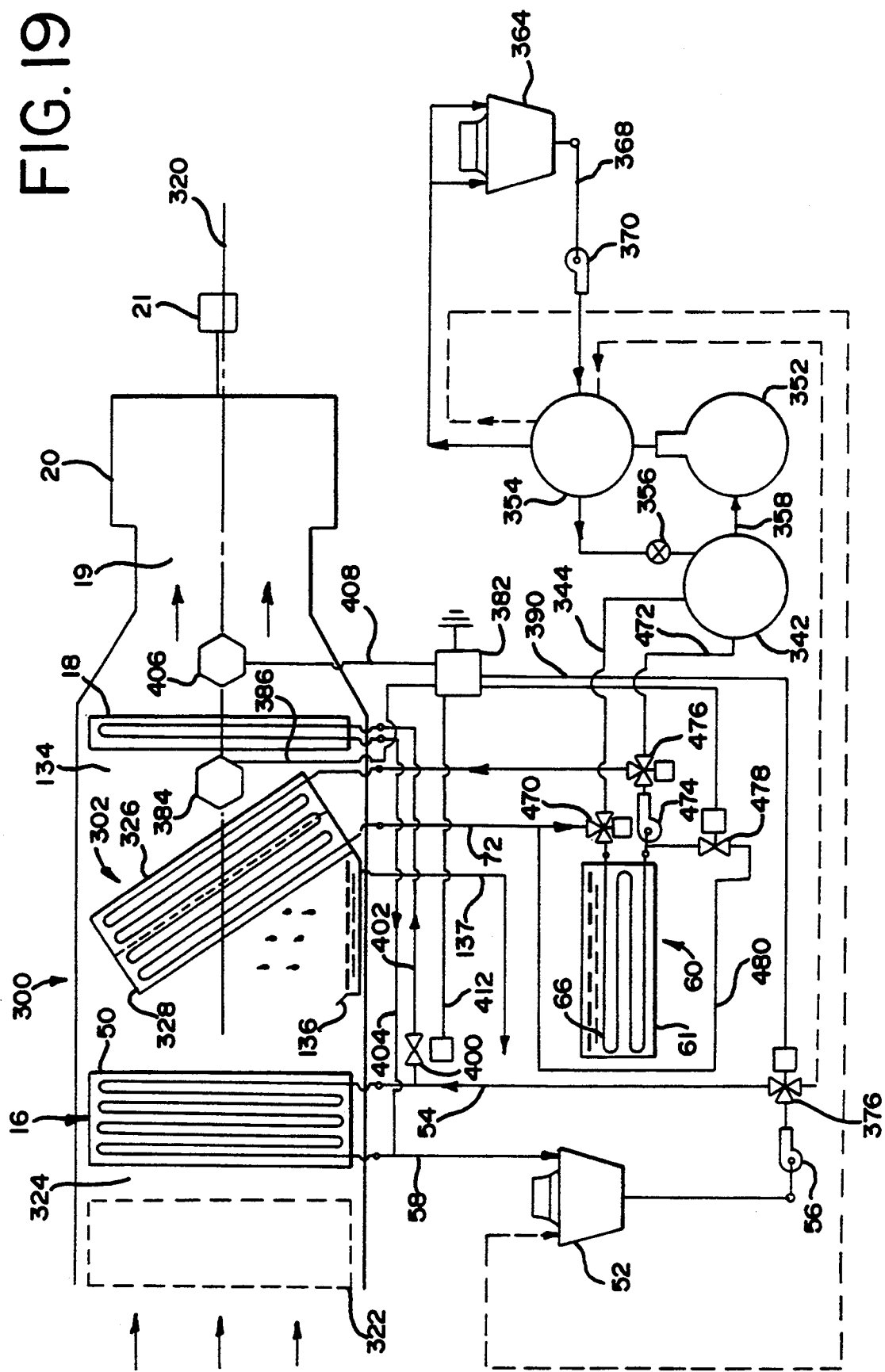
FIG. 19 is a further embodiment of the apparatus and arrangement of the several elements of the present invention.

In FIG. 19, the general structure of the embodiment illustrated in FIG. 16 is expanded to utilize the glycol refrigerant as the coolant in ICC 302. In this configuration, three-way valve 470 is positioned in delivery conduit 344 ahead of coil 66 for transfer of the cold glycol to coil 66, and it is also coupled to conduit 72 to receive warmed return fluid from ICC 302. The return line 472 and pump 474 have a second three-way valve 476 coupled therein to control fluid flow to glycol chiller 342, which valve is also coupled to feed line 40 for ICC 302 to deliver glycol which has been chilled in TSU 60 to ICC 302. A second two-way valve 478 is coupled to return line 72 between ICC 302 and valve 470 by conduit 480 and ahead of pump 474 to communicate return glycol fluid from ICC 302 to pump 474. The servomechanism of valve 478 is coupled to controller 382 by line 391 and operable in response to a signal from sensor 384.

Figure 20:
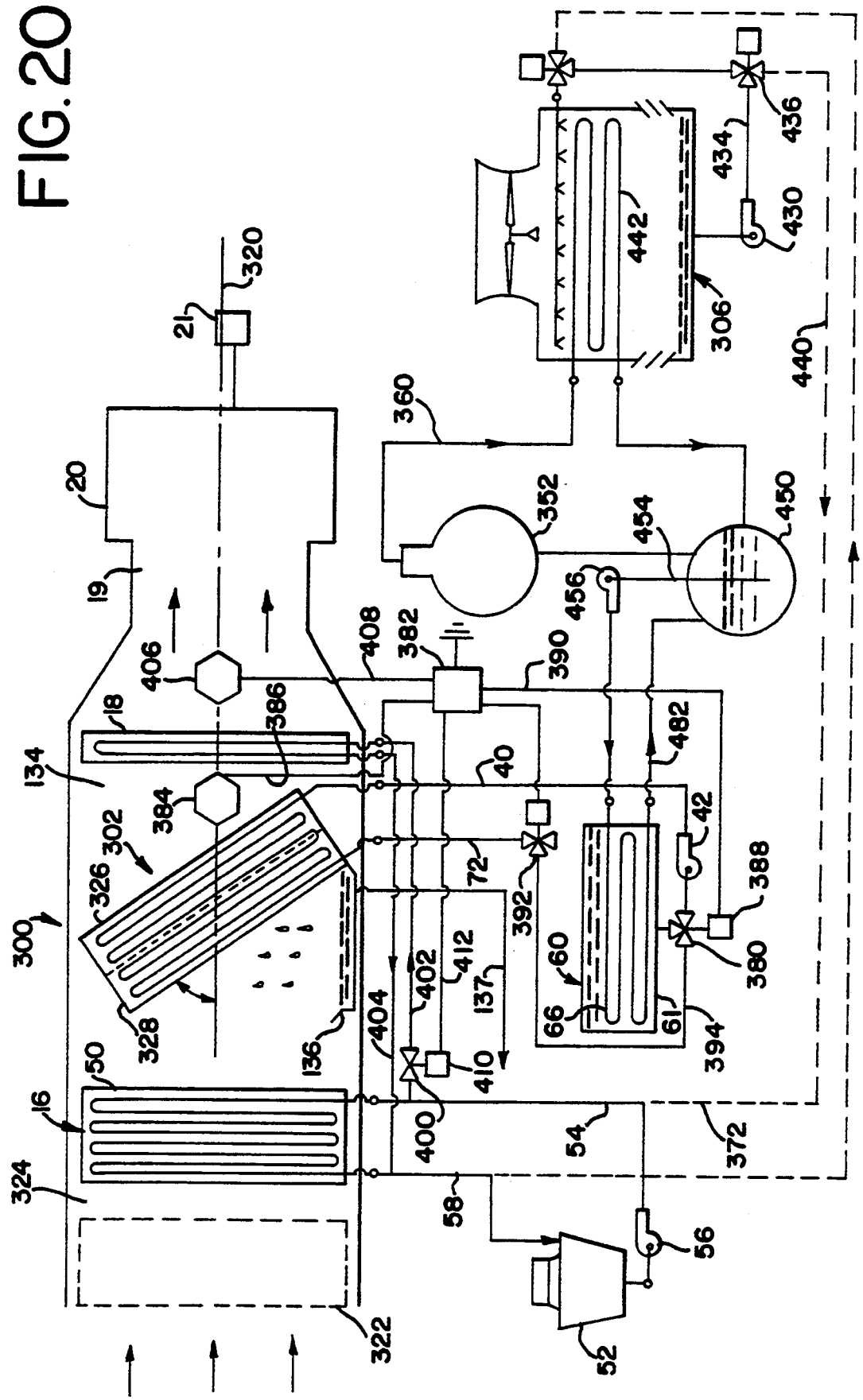
FIG. 20 is an alternative arrangement of the apparatus and components of FIG. 18; and, FIG. 21 is an alternative embodiment of the apparatus and components of FIG. 17.

A further embodiment in FIG. 20 utilizes the basic configuration illustrated in FIG. 18, which utilizes a refrigerant and low-pressure receiver arrangement and evaporative condensor 306 in lieu of the cooling tower 364. In this case, refrigerant is communicated from compressor 352 to evaporative condensor 306. In the embodiment of FIG. 20, pump 456 conducts liquid refrigerant from receiver 450 to coil 66 and the refrigerant vapor and any entrained liquid refrigerant is returned to receiver 450 by conduit 482.

Figure 21:
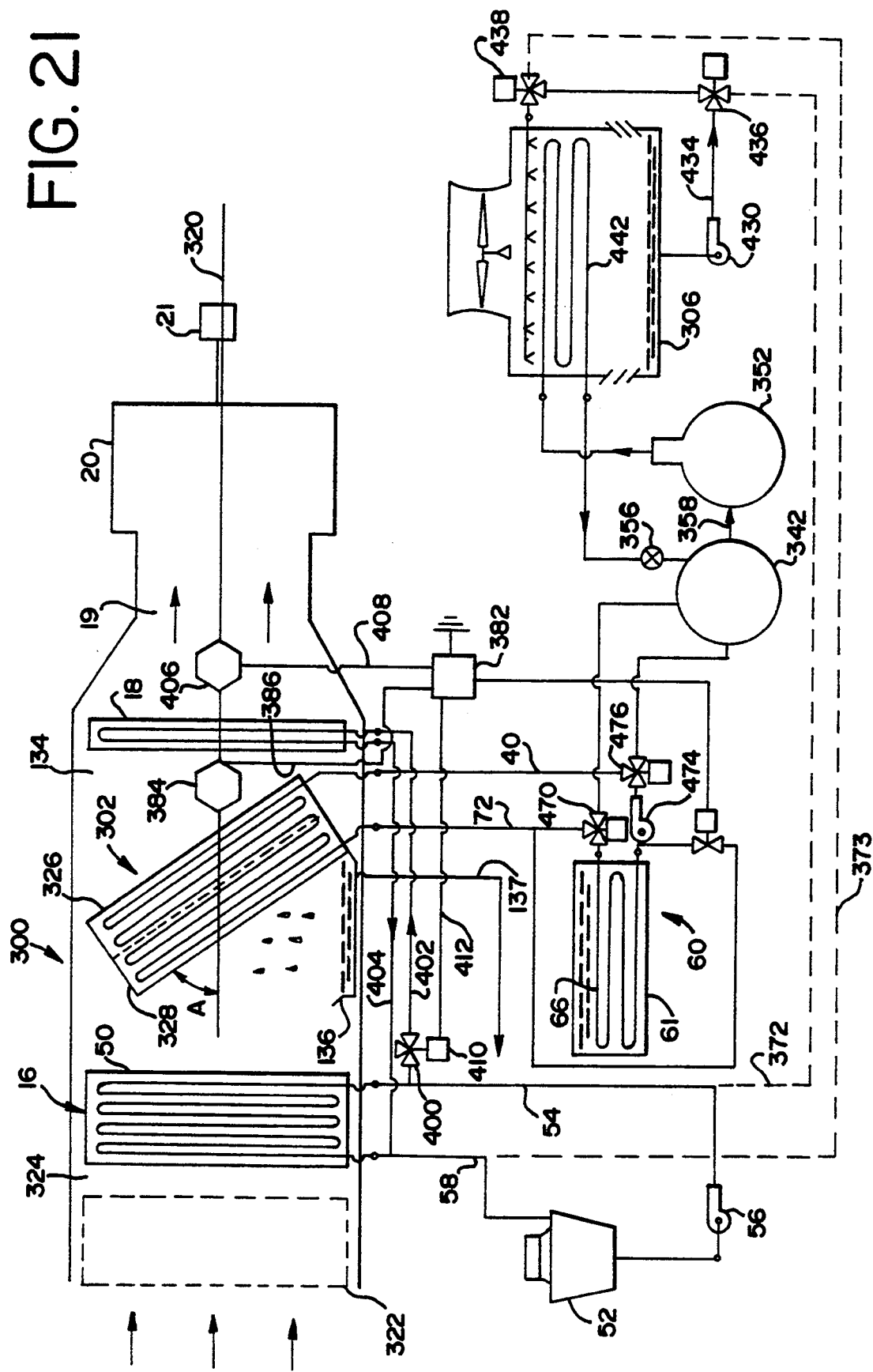

FIG. 21 shows a further embodiment of the present invention combining the structure of the apparatus of FIG. 17 in combination with the operating mode of the structure of FIG. 19 to utilize the glycol direct feed to ICC 302. The evaporative condenser is used in lieu of the condenser and cooling tower structural arrangement. In addition, this apparatus takes advantage of the availability of the glycol cooling directly from the glycol chiller as well as making the glycol available as a refrigerating agent for the storage media in TSU 60. The glycol is communicated to chiller 342 for delivery to valve 470 and TSU 60, and subsequent return to chiller 342 during the chilling and freezing cycle for the storage media. However, during the period of inoperation of the compressor, the spray water of the evaporative condenser 306 may be utilized to cool the coolant for IEC 50, thereby avoiding the need for cooling tower 52. This avoidance of the necessity of cooling tower is shown by the dashed lines 372 and 373 to provide fluid transfer between IEC 50 and evaporative condenser 306 spray water, through valve 436, 438 and pump 432.

Indirect evaporative cooler 16 is operable to sensibly cool air passing therethrough, and in a preferred embodiment includes cooling tower 52 and finned coil 50 as a heat transfer apparatus. Coil 50 is connected by conduit 54 with second in-line pump 56 to first cooling tower 52, which pump 56 is operable to circulate a second coolant fluid, such as water, through coil 50 and conduit 54. Coil 50, which is cooled by coolant from tower 52, cools the air passing through finned coil 50 without adding moisture or humidity to the air stream.

Figure 1:
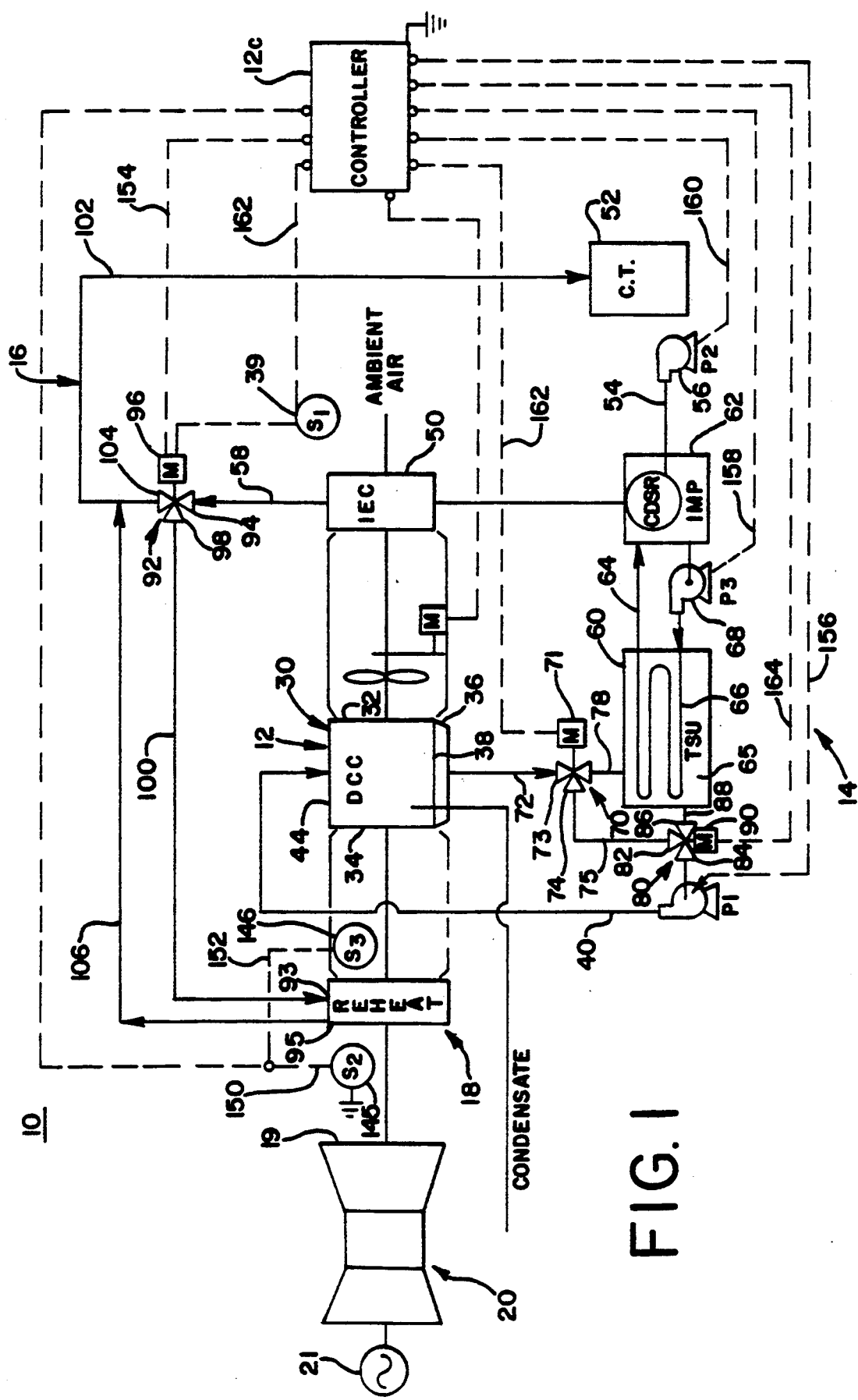
FIG. 1 is a schematic diagram of a preferred embodiment of the air pre-chilling system coupled to an air consuming apparatus shown as a gas turbine.

In FIG. 1, conduit 54 is shown as coupled to and through ice making plant (IMP) 62. In the embodiment of FIG. 14, coil 50 is directly coupled to tower 52 by conduit 54 and pump 56. However, cooling tower 52 may also operate in cooperation with IMP 62 for cooling during an ice-making operation to reduce the components required for a system 10, which was taught and discussed in the earlier Smith et al.—'352 patent.

As in the earlier taught structure of this '352 patent, it is known that all the air passing through coil 50 does not contact the coil or fins. However, as a pragmatic consideration the incoming or ambient air volume passing through coils 50 may be treated as contacting coil 50, as that air not directly contacting the coils is blended with the directly contacting air to provide an average discharge air temperature. Calculation and accommodation of the relative amounts of such specific coil contacting and non-contacting portions of the air volume may be accounted for by mathematical functions, such as the bypass factor. In a commercial environment, the specific quantity of non-contacting air mixed with the contacting air provides a generally uniform temperature in the discharged air from coil 50. The cooled air from coil 50 may be directly communicated to turbine 20 through air conduits; transferred through indirect-contact air chiller (ICC) 302 with pump or compressor 304 deactivated; transferred through ICC 302 with compressor 304 activated either with or without a thermal storage unit (TSU) 306 in the fluid flow circuit for further air temperature reduction; and, transferred through reheat coil 18. The particular air-flow path is elective by the operator and may be manually selected; automatically provided by baffles and deflectors; or otherwise directed within system 300.

Reheat coil 18 in the figures in interposed between discharge or outlet side 134 of ICC 302 and turbine inlet 19, and is operable to slightly elevate the discharge air temperature and control the relative humidity of the discharge air communicated to turbine 20. Reheating coil 18 is preferably a finned tube coupled to receive fluid directed to IEC 16, which fluid is at a reduced but not necessarily chilled temperature, is provided at a fluid pressure to reheat coil 18 for heat transfer to air flowing past coil 18. Slight reheating of cooled discharge air is not counter productive, rather it provides both temperature and humidity control of the discharge air. In the embodiment of FIG. 16, coolant flowing to IEC coil 50 and conduit 54 communicates through servo control valve 400 to either reheat coil 18 for discharge air heating and relative humidity control, or to IEC 50. More specifically, conduit 54 communicates coolant fluid, from IEC coil 50 to valve 400. This coolant fluid may be directed by valve 400 and servomechanism 410 in response to a sensed signal from sensors 406 or 384, to communicate coolant fluid to reheat coil 18 through first conduit 402, or alternatively to conduit 54 and IEC coil 50. Coolant fluid from reheat coil 18 is recycled through conduits 404 and 58 to cooling tower 52. Control and adjustment of the discharged air temperature may be controlled by varying volume of coolant flow through reheat coil 18, and may be responsive to environmental or operating parameters monitored, sensed of measured by sensors 406 or 384, which may be coupled to valve 400 through controller 382 and lines 386, 412 to regulate its position to provide partial flow through coil 18 and divert the remainder of the fluid flow through conduit 54 to IEC coil 50.

Each of the several components in system 300, such as servo-operators 410 and 388 of valves 400 and 380, respectively, as well as pumps 42, 56, and 370 may be manually operable or preset. they may also be coupled to and controlled by a controller 382 as known in the art. Controller 382 is operable to receive signals of measured parameters, such as air temperature, coolant temperatures, air flow speed, relative humidity, pressures or other physical conditions from sensors 384 and 406 to provide control signals to the servo valves, pumps or other controllable operators, based upon these sensed signals. In an illustrative control operation, sensors 384 and 406 are, respectively, positioned upstream and downstream of reheat coil 18. As an example, sensors 384, 406 provide signals, such as temperature, on lines 386, 408, respectively, to a comparator in controller 382 for generating a control signal to servomechanism 410 on line 412. Similar coupling and control signals may be provided to pumps 42 and 56 on lines not shown, respectively from any of sensors 384 and 406. In the figures, sensors 384 and 406 are coupled to controller 382 by lines 386 and 408, respectively, to provide the sensed signal to controller 382. Similar output control signals may be provided from controller 382 to servomechanisms of the several valves. The specific operating condition or physical parameter sensed by sensors 384 and 406, such as moisture or temperature, the choice of direct coupling of a sensor to a pump or servomechanism or the number and position of the sensors is a design choice and not a limitation. The specific operating condition, monitored physical parameter or sensing device is also the choice of the owner and/or operator of system 300.

System 300 is designed for the cooling, air water vapor recovery and/or humidity control of air flow communicated to a gas turbine 20, but it is also operable, with all pumps deactivated, to allow transfer of ambient air to gas turbine 20 without a change in the physical structure of system 300. However, as gas turbines 20 for power generation are frequently utilized to supplement power generating equipment at peak-use periods, it is desirable to reduce the turbine inlet air temperature by communication of ambient air through at least one of IEC 16 and ICC 302 to increase gas-turbine power output, and to reduce plant fuel consumption per unit output KW, which positive change in power availability and efficiency, during warm ambient periods is reflected by the relative slopes of the plotted curves in FIG. 10.

Figure 2:
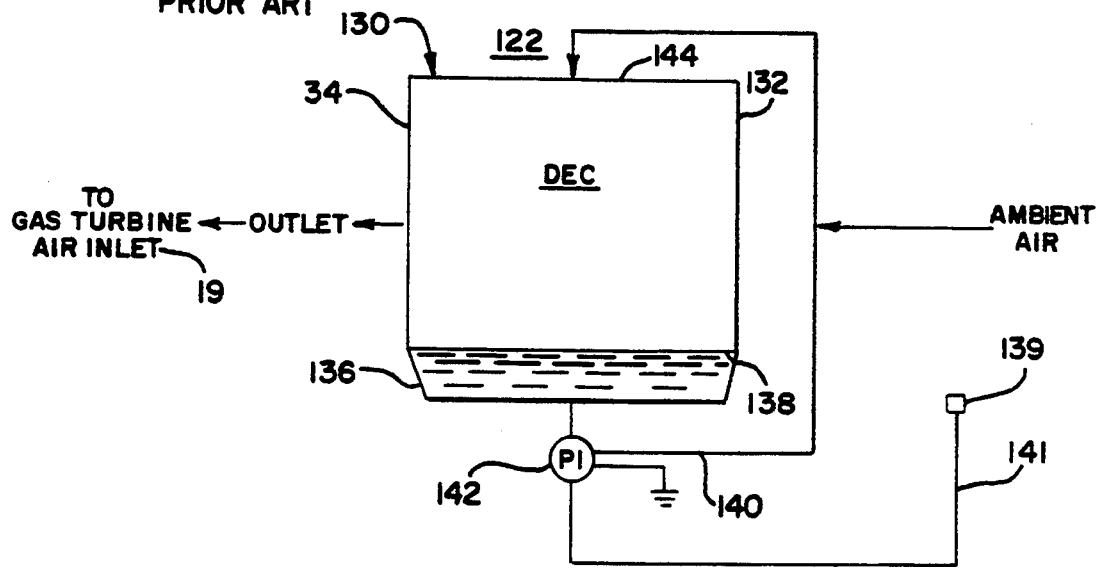
FIG. 2 illustrates a known evaporative cooling apparatus for delivery of evaporatively cooled air to a gas turbine compressor air inlet.

Attainment of lower temperature inlet air, as well as control of the relative humidity, may be accomplished by system 300 by a variety of operational paths. The precise plumbing network, ductwork, baffles and other apparatus to direct the air flow along a chosen flow path is not illustrated in the figures, but is known in the art. The prior art operational mode illustrated in FIG. 2 by the sole utilization of evaporative cooler 130 for inlet air can only provide the above-noted change in temperature with low relative humidity ambient conditions. This dry bulb temperature depression can be expected to be about 90% of the differential between the ambient air wet-bulb and dry-bulb temperatures. The discharged air from this evaporative cooler, which is being transferred to turbine 20, may be moisture saturated in this operating mode but no specific provision is made for control of relative humidity. Thus, the potential exists for entrainment of suspended water particles, which may be detrimental to the blades of gas turbine 20.

As noted above, alternative modes of operation and alternative paths for air flow and coolant fluid flow in the earlier system 10 are noted in FIG. 3 in a block diagram flow chart where combinations of the several system components are arranged to provide discharge air to gas turbine (G-T) 20. The particular flow path for both the incoming air and the coolant fluids is the choice of the operator and may be a function of ambient air temperature and relative humidity, as well as the desired discharge air and load characteristics. Colder discharge air than is available from IEC 16 may be obtained using ICC 302 and TSU 60 to reduce the temperature of coolant fluid to ICC 302, which coolant temperature may be about the freezing temperature of water. The chilled coolant temperature can be expected to be well below the wet-bulb temperature of the incoming air, which will further decrease the discharged air temperature. As the ice-water coolant fluid temperature is well below the incoming air dew-point, dehumidification will result, which condensed moisture will collect in sump or pan 136 and may be utilized for other purposes or otherwise discarded. The final rewarmed coolant temperature from ICC 302 to return line 72, which is a measure of air cooling, will depend upon total heat transfer and the coolant volume, but the discharged air temperature from ICC 302 will decrease well below the air temperature which is evaporatively cooled with ambient-air-temperature water. In addition, the air density of the reduced temperature air will be increased above ambient air density.

Figure 12:
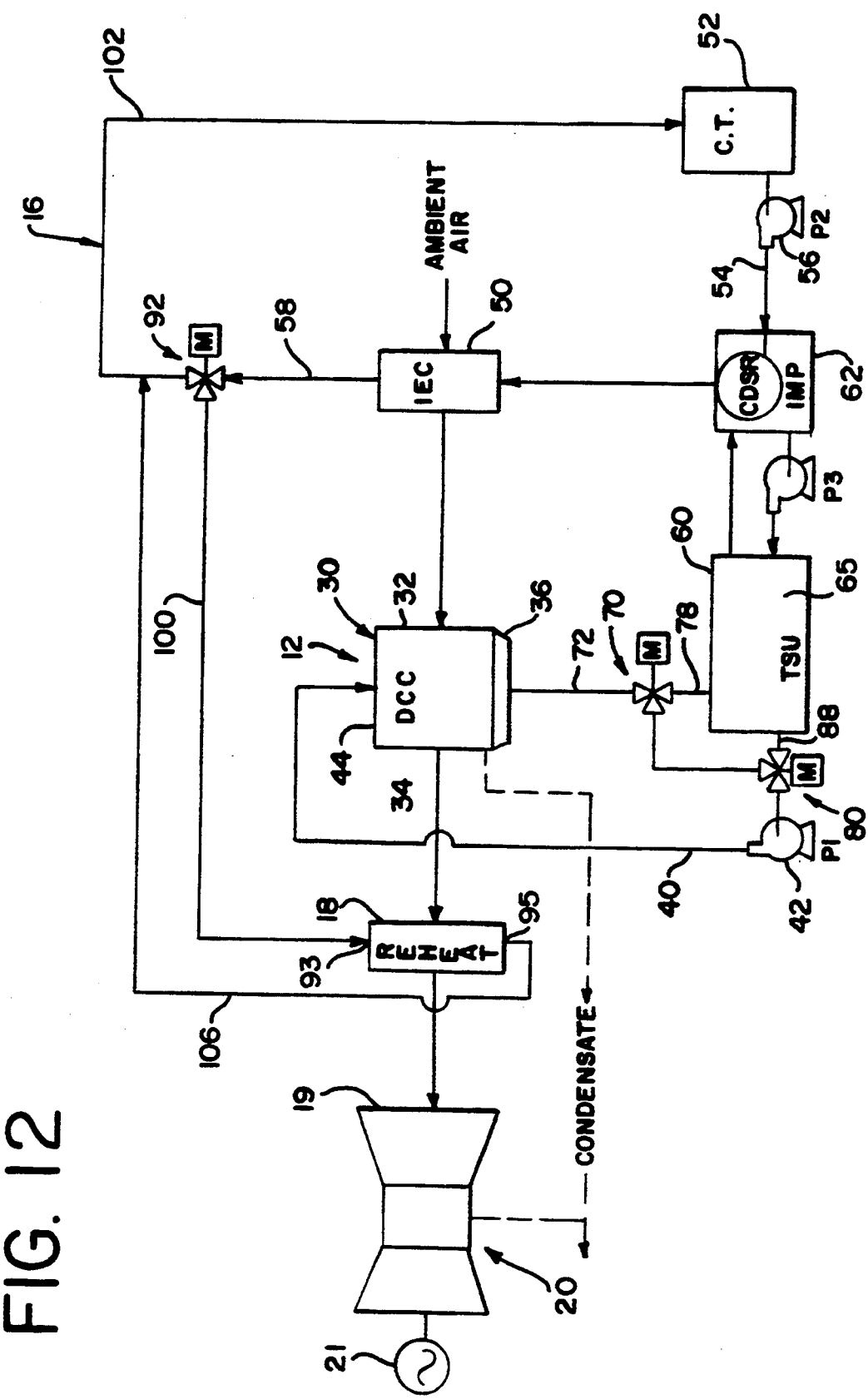
FIG. 12 illustrates the operating fluid and air flow paths for the system of FIG. 1.
Figure 13:
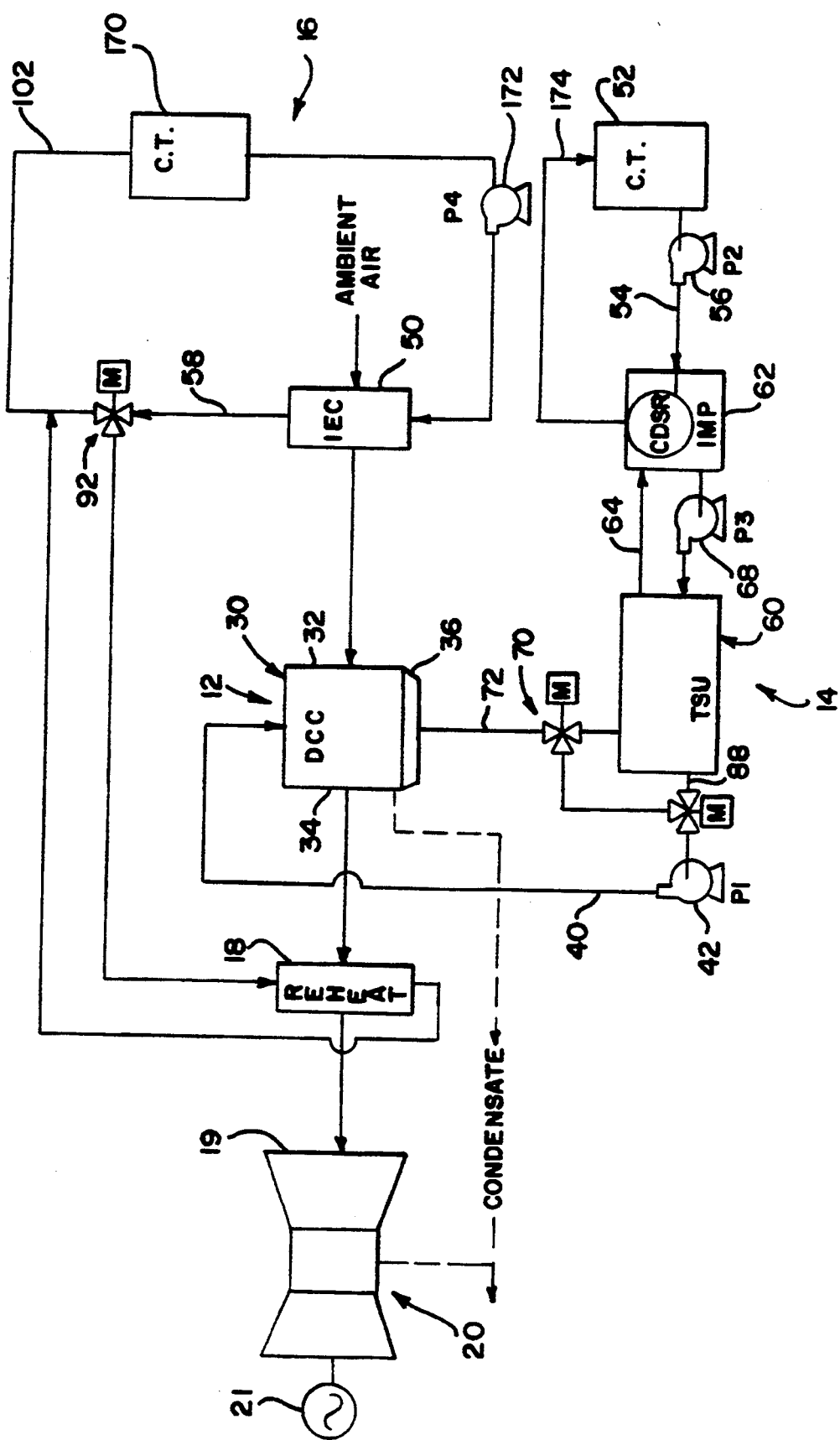
FIG. 13 illustrates an alternative embodiment providing for continuous supplemental and simultaneous cooling of the thermal storage unit and air to the gas turbine compressor.

Several of the operating modes listed at FIG. 3 are diagrammatically illustrated in FIGS. 4–8 and 12. In FIG. 12, ambient air is communicated past IEC coil 50, DCC unit 30 and reheat coil 18. Cooled second coolant from coolant tower 52 is being recirculated through conduit 54 to coil 50 for cooling the ambient air passing through the coil for communication to DCC 12. The coolant is illustrated as passing through IMP 62, however, without the condensor and compressor operating the effect upon this fluid flow path is nil, and a similar bypassing could be effected by a diverter valve and conduit arrangement. The coolant fluid in conduit 58 is shown as being diverted through valve 92 to both conduit 100 and conduit 102, which communicates the warmed fluid to cooling tower 52 for cooling and recycling through IEC coil 50. The ambient air, as shown in FIG. 3, is reduced in temperature from Z to A at a constant absolute humidity content, and communicates directly to DCC unit 30. In the particular structure of FIG. 12, the arrangement of the several components provides subtle benefits to the user. Specifically, utilization of IEC coil 50 to initially reduce the air temperature, reduces the amount of air cooling required in DCC unit 30, which can provide an extended operating time for the chilled coolant in TSU chamber 65, reduce the required coolant flow through DCC unit 30 and thus pump capacity can alternatively allow greater air flow and treatment at the same pump capacity or it may be viewed as a means to increase the operating capacity of system 10.

Figure 11:
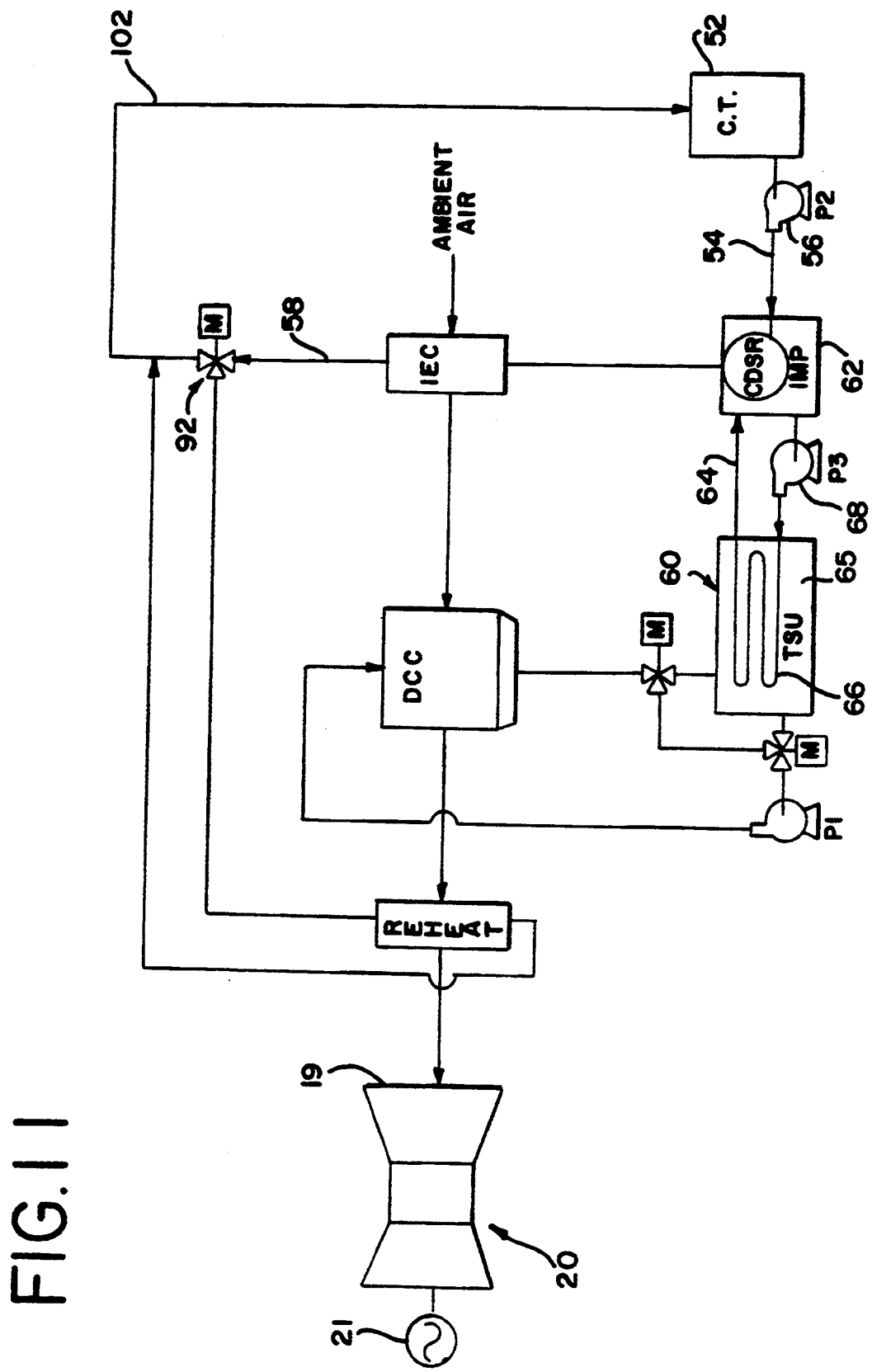
FIG. 11 illustrates the fluid and air flow paths for the system of FIG. 1.

In a specific example of an electrical generator coupled to a turbine, the effects reducing the input air temperature from 101.6 F. to 42 F. can be shown to result in an output power gain from 52600 KW to 66630 KW, which is about 14030 KW or about a 27% gain in power without adding any undesirable emissions. The accomplishment of this increase in power does not require excessive power usage except for the pump, as the frozen coolant mass in TSU 60 is generated at a desirable period, that is minimum load periods, and utilized at peak load periods. The generation of the cooling mass in TSU 60 is illustrated in FIG. 11, where the second coolant fluid from cooling tower 52 is transferred to the condensor of IMP 62 and the refrigerant from IMP 62 is pumped by pump 68 through coils 66 in TSU chamber 65 to freeze or chill the first cooling fluid in TSU 60. The second fluid is recirculated through the fluid circuit of IEC 16 for return to cooling tower 52 without diversion through reheat coil 18. During the rebuilding cycle in TSU 60 no coolant fluid from sump 36 is communicated through chamber 65. However, it is recognized that in a dynamic situation both cooling mass buildup and first coolant fluid flow through TSU 60 could simultaneously occur, but at a reduced flow rate. The dynamics of any given system require determination of coolant fluid flow rates, ambient temperatures, system component capacities and operating needs. The specific individual operating mode is the choice of the user.

Figure 5:
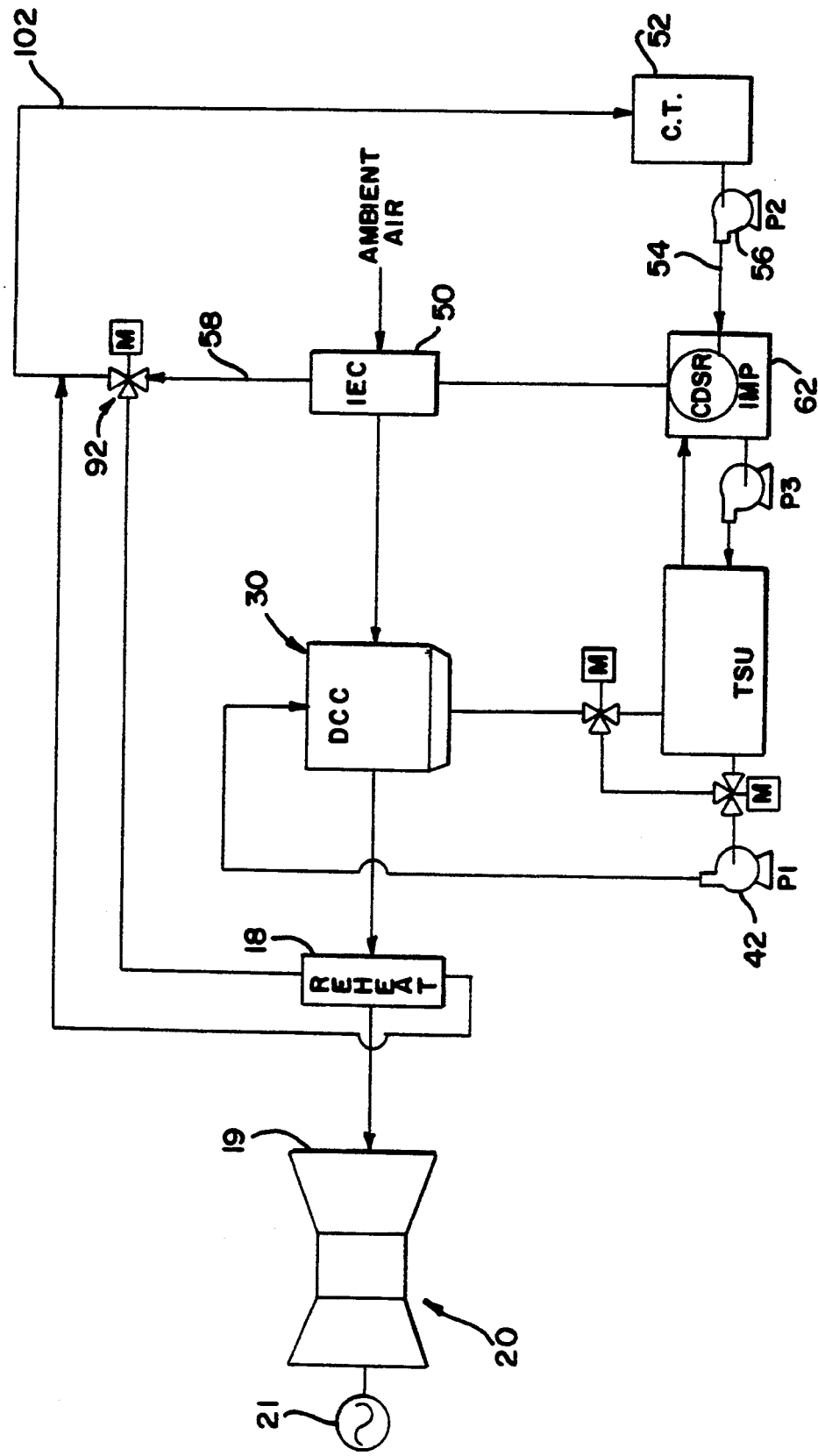
FIG. 5 illustrates a second operating mode of the system of FIG. 1.
Figure 6:
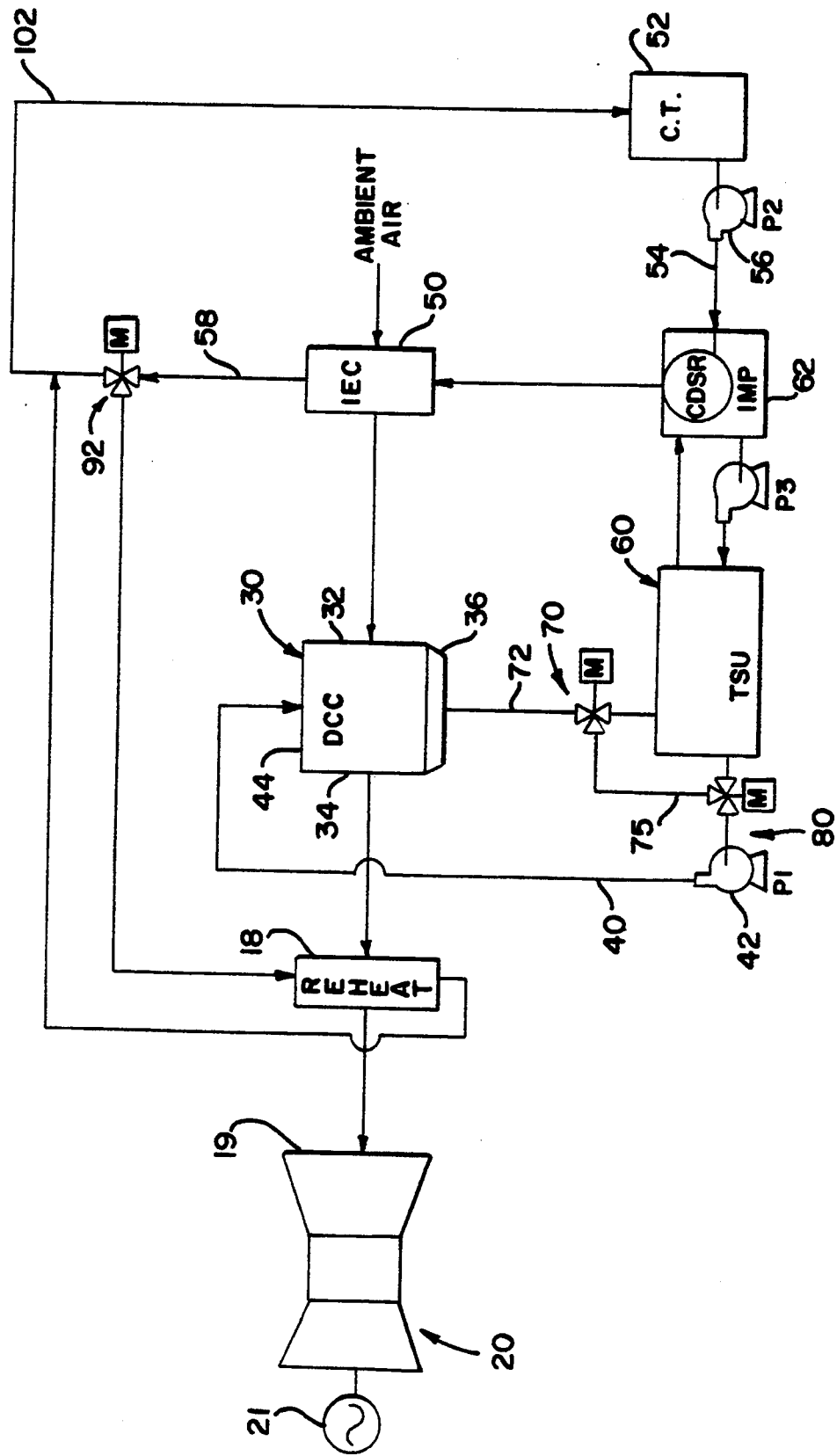
FIG. 6 illustrates a third operating mode of the system of FIG. 1.
Figure 9:
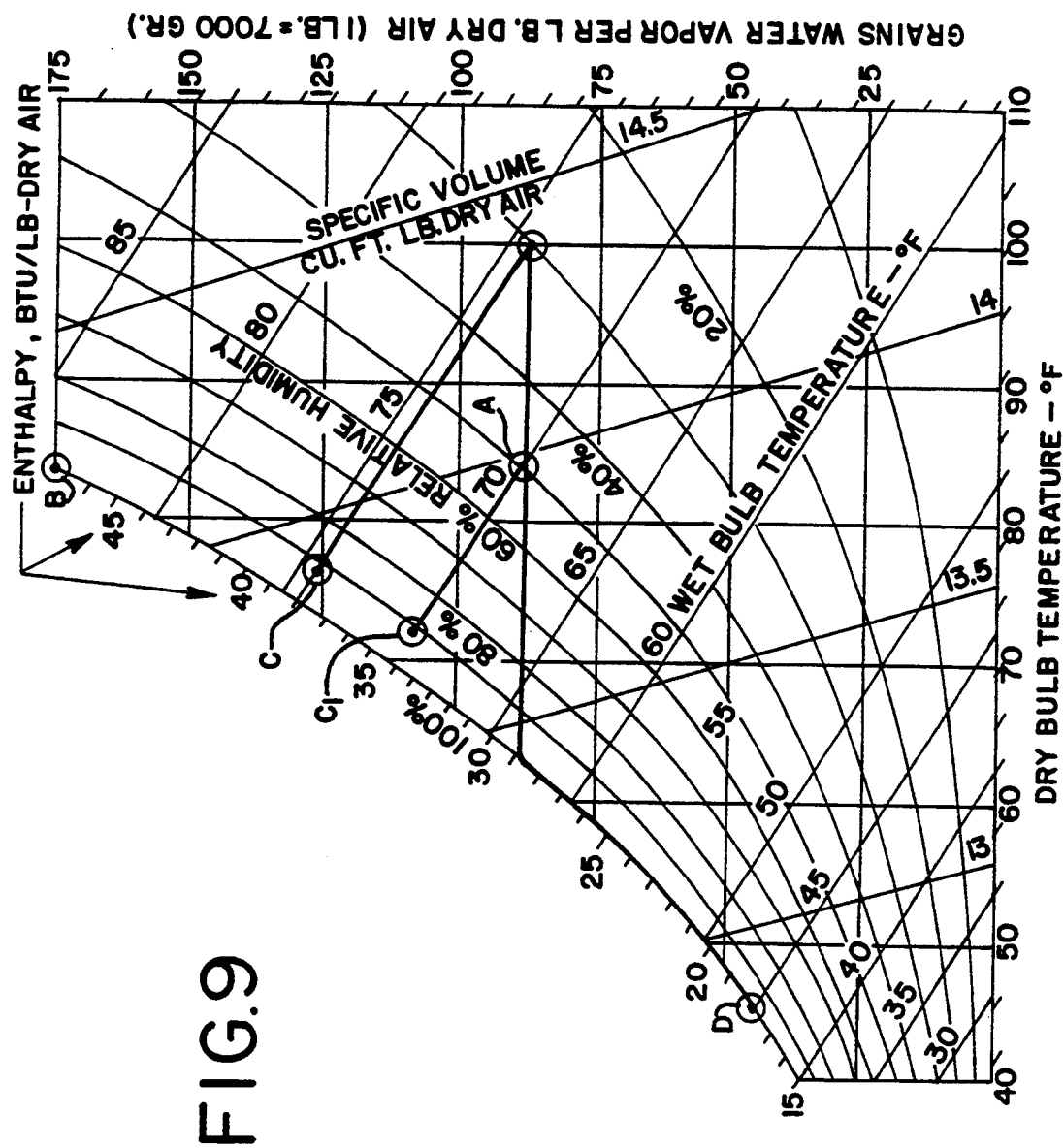
FIG. 9 is a psychrometric chart illustrating the relationship between dry bulb air temperature as a function of the water vapor content per pound of dry air, as well as the relationship between wet-bulb temperature, enthalpy, dew-point, relative humidity specific volume; and, FIG. 10 is a graphically illustrates the performance capabilities of a gas turbine KW output and heat rate as a function of the compressor inlet (air) temperature.

In FIG. 5, IEC 16 is the sole air cooling component and at continuous operations second coolant fluid will be at about ambient air temperature. Fluid flow in DCC 12 is curtailed by deactivitating pump 42, and no fluid flow is directed to reheat coil 18 by valve 92. The resultant air flow from IEC coil 50 passes through DCC unit 30 and reheat coil 18 for communication to turbine inlet 19 without further temperature reduction. The operational effect of this IEC cooling is depicted in FIG. 9 by a change in the air characteristics from point Z to point A, which provides a reduced dry-bulb temperature but an increase in the relative humidity with no change in the total moisture content of the air. As the dew-point temperature is not attained, the air is not dehumidified. A similar effect would be noted in the present invention where ICC 302 and reheat coil 18 are deactivated.

Figure 7:
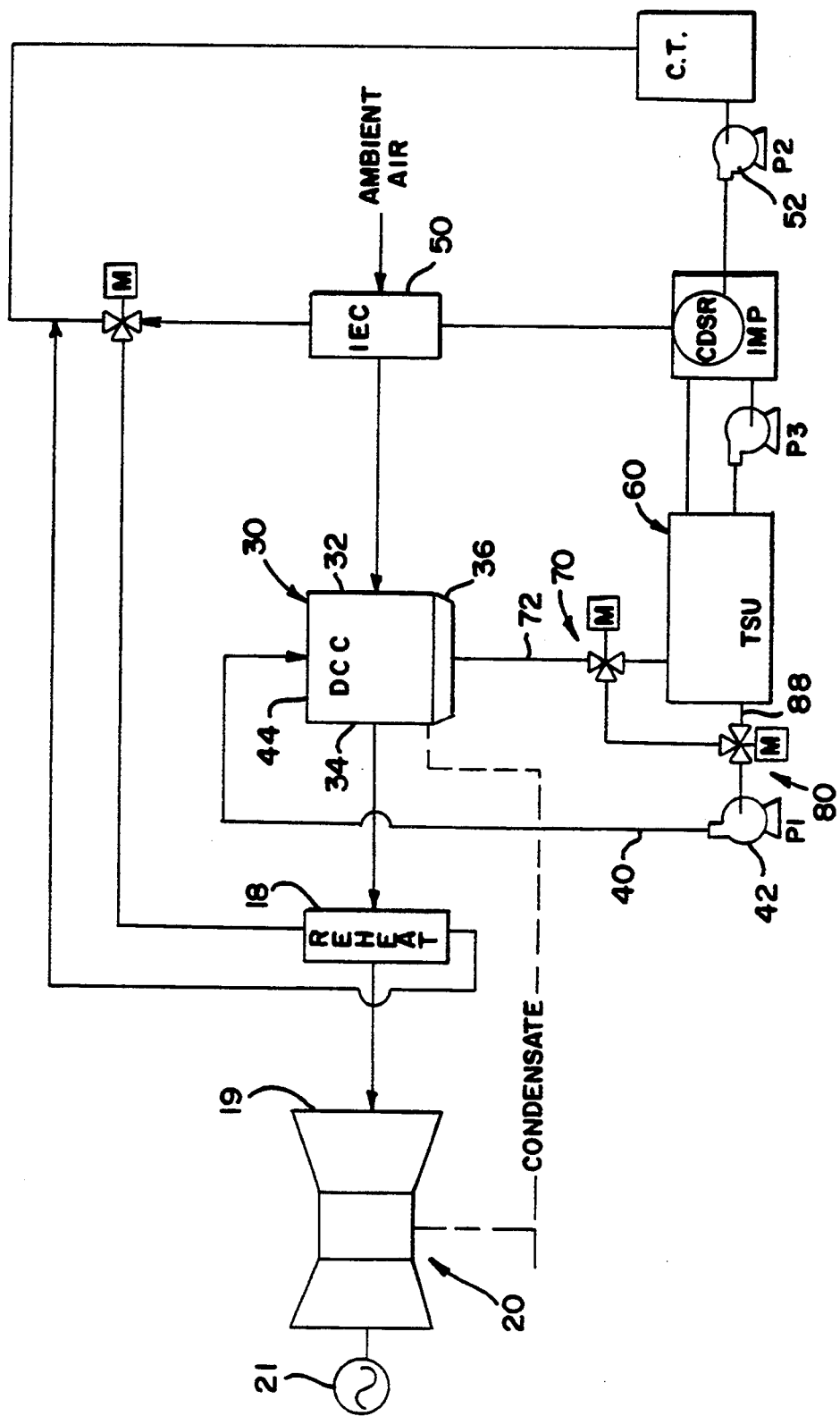
FIG. 7 illustrates a fourth operating mode of the system of FIG. 1.
Figure 8:
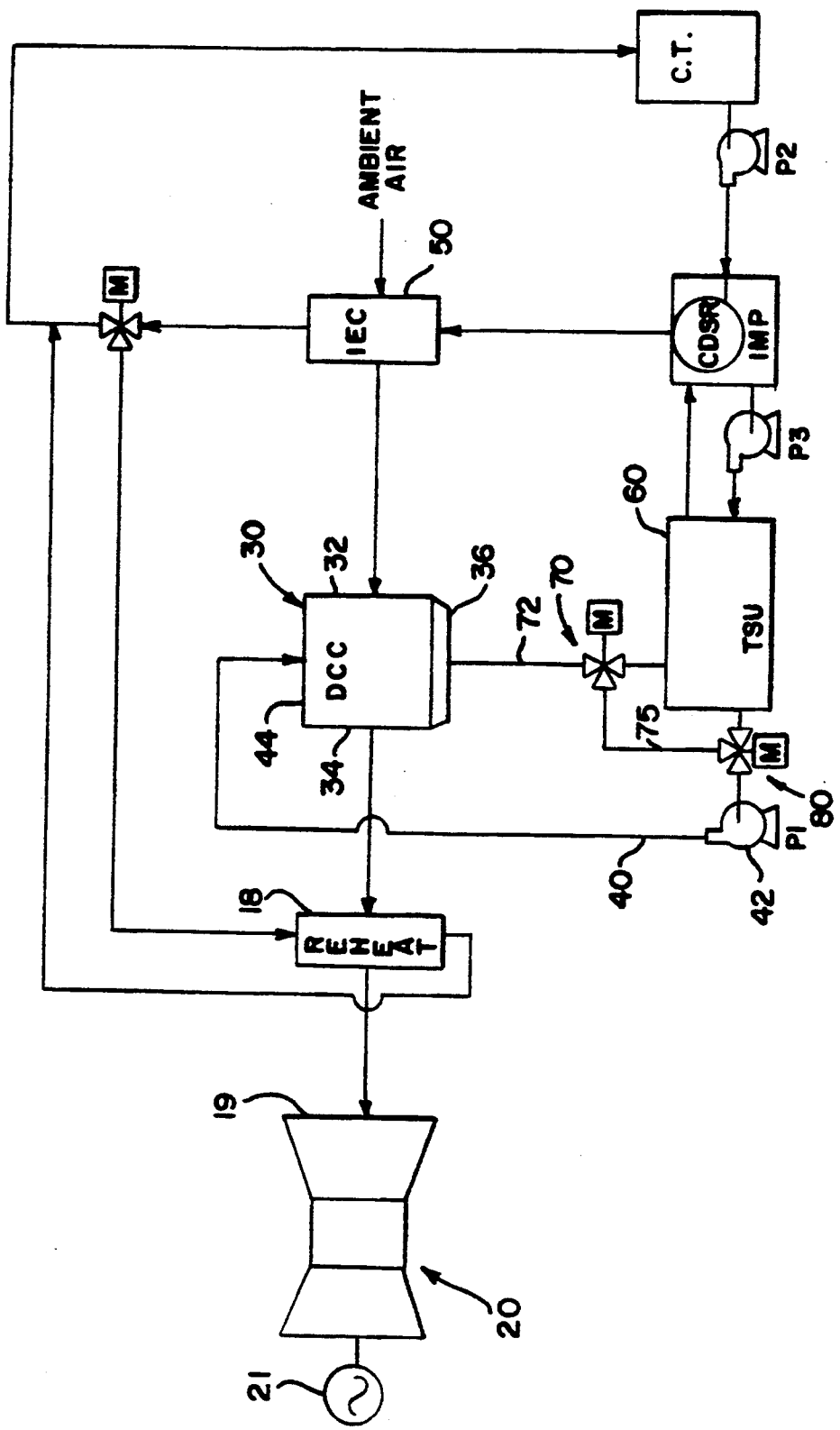
FIG. 8 is a fifth operating mode showing the availability of the prior art method of FIG. 2 with the system of FIG. 1

The sole use of DCC 12 to act on the ambient air to reduce the air temperature is illustrated in FIG. 7. Ambient air is unaffected by its passage through IEC coil 50 as pump 56 is not circulating second coolant fluid through the fluid circuit of IEC 16. In addition, no fluid is communicated to reheat coil 18. The direct contact of ambient air with the coolant fluid on the media in DCC unit 30 provides an air temperature reduction down to the dew-point to initiate condensation and further temperature reduction to about the temperature of the coolant fluid. The discharging air at outlet side 34 is at or about the coolant fluid temperature and the dew-point moisture. Communication of the discharge air to turbine air inlet 19 is unaffected by the transplant through reheat coil 18. A similar effect can be expected by solely utilizing ICC 302.

All of the above discussions are premised upon adequate residence time of the air in each of the components and an appropriate operating temperature.

System 300 permits temperature reduction and humidity control of ambient air for introduction to an air consuming apparatus. System 300 allows the operator great flexibility in the choice of components to attain a specific temperature and humidity level. More particularly, the structure of FIGS. 14–21 provides apparatus to permit the following: indirect evaporative cooling of ambient air; indirect contact chilling of the air to reduce both air temperature and absolute humidity; and, slight reheating of chilled air to reduce the relative humidity and minimize any entrained moisture droplets.

Further, each of the several components may be actuated at the election of the operator to act on the air passing therethrough. The choice of component actuation may be a function of a desired end point or discharge air temperature, absolute or relative humidity, incoming air conditions or other operating parameters.

In the preferred embodiment of FIG. 17, system 300 is coupled to gas turbine-generator 20 and is operable to provide reduced temperature air to turbine generator 20. Ambient air communicates past IEC coil 50 which is operable by the passage of coolant fluid through cooling tower 52, conduits 54 and 58, and IEC coil 50 to reduce the temperature of the air from Z to A at the same absolute humidity as shown in the psychrometric chart of FIG. 9.

Downstream of IEC 16 is ICC 302 with ICC unit 326 receiving the air stream. Unit 326 is operable as an indirect contact cooler to reduce the temperature of the air and simultaneously dehumidify it. Ice-chiller assembly 14 can cool the coolant fluid circulating through unit 326 below the dew-point of the air. In operation with unit 326, the chilled coolant will react with air from IEC coil 50, which may be either cooled air or ambient air, to reduce the air temperature to and below the dew-point of the air entering ICC unit 326, which results in both air temperature reduction and dehumidification. The election to utilize ice chiller assembly 14 and more specifically thermal storage unit 60 is an election for the user-operator, and may depend upon the desired properties of the air transferred to turbine-generator 20. In a diurnal system, a cooling mass, such as ice, is generated and stored during one cycle, which cooling mass is then available for reducing the temperature of a contacting coolant fluid. This cooling-mass-generating cycle in the exemplary generator illustration may occur during an off-peak demand period, such as the night time, which minimizes the cost of generating the cooling mass (ice) as the cost of electrical power is usually lower for commercial users during the off-peak hours. The cooling mass in TSU 60 is then dormant until coolant is communicated through TSU 60. As this material is immediately available in the example of FIGS. 16–21, it is readily apparent that its integration into the fluid flow circuit of ICC 326 requires a minimal effort, which can initiate temperature reduction of the coolant and consequently, the air transferred through ICC unit 326. As noted above, valves 392 and 388 can be arranged to throttle or control the flow through TSU 60 to adjust the coolant temperature, rate of ice-melting or other considerations.

The air flow thereafter passes through reheat coil 18, which is operable to heat the air from ICC unit 326. As a pragmatic matter, the elevation of the air temperature is generally a consideration only at very low air temperatures with the moisture at or about the dew-point. Reheat coil 18 is operable by the diversion of coolant from conduit 54, which coolant is being fed to IEC coil 50. The fluid is diverted by valve 400 through conduit 402 to reheat coil 18 and thereafter returned to conduit 404 for recycling through IEC coil 50 and cooling tower 52. Reheat coil 18 is operable to slightly elevate the outlet air temperature from ICC unit 302 and to reduce its relative humidity to about 85%, which will minimize the potential for entrained moisture.

The operating components chosen and the degree of air temperature depression or dehumidification at each process step are elective with the user, which versatility and options can act to minimize system operating costs or alternatively provide alternative system configurations not requiring all of the several components.

While only specific embodiments of the invention have been described and shown, it is apparent that various alterations and modifications can be made therein. It is therefore, the intention in the appended claims to cover all such modifications and alterations as may fall within the true scope and spirit of the invention.

We claim:

1. A precooling system for combustion air communicated to a gas turbine, said system operable to receive and treat ambient air, and to communicate said combustion air to said turbine at a desired outlet temperature, said ambient air having a wet-bulb temperature, a dry-bulb temperature, an absolute humidity and an ambient air density, said combustion-air outlet temperature being less than said ambient-air, wet-bulb temperature and said combustion air outlet density greater than said ambient-air density, said system comprising:

an indirect-evaporative chiller operable to reduce the temperature of air passing through said indirect-evaporative chiller to a first temperature, a first absolute humidity and a first air density;

an indirect-contact chiller having an air inlet side, an air outlet side, a coolant fluid inlet, a coolant fluid outlet, and means for exchanging heat between a first coolant fluid and said air passing through said indirect-contact chiller, said turbine coupled to said air outlet side to receive said combustion air communicating through said indirect-contact chiller;

an ice thermal storage unit with a phase-changing fluid in said unit and means for reducing the temperature of said phase-change fluid to less than said air wet-bulb temperature and to freeze at least a portion of said fluid;

said phase-change fluid operable as said first coolant fluid in said indirect-contact chiller;

means for connecting said indirect-contact chiller and said thermal storage unit to communicate a phase-changing fluid;

means for recirculating a fluid, which recirculating means is coupled to said connecting means to circulate a phase-changing fluid from said thermal storage unit to said heat exchange means of said indirect-contact chiller to reduce said first temperature of said air flowing through said indirect-contact chiller to less than said ambient-air wet-bulb temperature.

2. A precooling system for combustion air communicated to a gas turbine as claimed in claim 1, further comprising a second coolant operable in said indirect-evaporative air chiller to cool said ambient air to said first temperature;

first means for cooling said second coolant from said indirect-evaporative air chiller, second means for connecting said indirect-evaporative air chiller and said first means for cooling, said first connecting means operable to communicate said second coolant at a first temperature from said indirect-evaporative air chiller to said first cooling means to reduce said first temperature to a second temperature less than said first temperature in said first cooling means and to provide said second coolant at said second temperature to said indirect-evaporative air chiller for cooling said ambient air.

3. A precooling system for combustion air communicated to a gas turbine as claimed in claim 2, wherein said first means for cooling is a first cooling tower, said second means for connecting said indirect-evaporative air chiller and said first cooling tower operable to communicate said second coolant between said first tower and said indirect-evaporative air chiller for reducing the temperature of said air communicating through said indirect-evaporative air chiller.

4. A precooling system for combustion air communicated to a gas turbine as claimed in claim 1, wherein said means to reduce the temperature of said phase-changing fluid has an evaporative condenser, means for compressing, a compressible refrigerant fluid, second means for connecting, and valve means in said second means for connecting said indirect contact chiller, said compressing means and said evaporative condenser to communicate said refrigerant fluid to one of said means to reduce the temperature of said phase change fluid and said indirect contact chiller to reduce said air temperature flowing through said indirect contact chiller and precooling system.

5. A precooling system for combustion air communicated to a gas turbine as claimed in claim 4, wherein said valve means is at least one three-way valve and a recirculation pump in said connecting means between said evaporative condenser and said indirect contact chiller.

6. A precooling system for combustion air communicated to a gas turbine as claimed in claim 5, wherein said compressing means is a compressor coupled between said indirect contact chiller and said evaporative condenser.

7. A precooling system for combustion air communicated to a gas turbine as claimed in claim 1, further comprising an evaporative condenser, a compressible refrigerant fluid, means for compressing and second means for connecting said ice thermal-storage-unit means for reducing with said evaporative condenser and compressor for communication of said compressible refrigerant fluid to said ice thermal storage unit to reduce said phase-change fluid temperature.

8. A precooling system for combustion air communicated to a gas turbine as claimed in claim 1 wherein said phase-changing fluid is one of ice water, glycol and a mixture of glycol and water.

9. A precooling system for combustion air communicated to a gas turbine as claimed in claim 1 further comprising means for reheating said air, said reheating means positioned between said indirect contact chiller and said turbine at said air outlet side to receive and to reheat said air from said indirect contact chiller to a desired temperature.

10. A precooling system for combustion air communicated to a gas turbine as claimed in claim 9, further comprising a second coolant operable in said indirect-evaporative air chiller to cool said ambient air to said first temperature;
   first means for cooling said second coolant from said indirect-evaporative air chiller,
   second means for connecting said indirect-evaporative air chiller and said first means for cooling, said second connecting means operable to communicate said second coolant at a first temperature from said indirect-evaporative air chilled to reduce said coolant first temperature to a coolant second temperature less than said first temperature in said first cooling means and to provide said second-coolant at said second-temperature to said indirect-evaporative air chiller for cooling said ambient air, wherein said reheating means is coupled to said second means for connecting to receive said second coolant fluid for control of said reheating means and the temperature of the air flowing through said reheating means to said turbine.

11. A precooling system for combustion air communicated to a gas turbine as claimed in claim 1, wherein said indirect-contact chiller means for exchanging heat is a refrigeration coil.

12. A precooling system for combustion air communicated to a gas turbine as claimed in claim 1, wherein said indirect-contact chiller means for exchanging heat is a coil with at least one tube,
   a plurality of cooling fins mounted on said tube to enhance heat transfer between said air and a phase-change fluid.

13. A precooling system for combustion air communicated to a gas turbine as claimed in claim 12, wherein said coil has a manifold for said at least one tube.

14. A precooling system for combustion air communicated to a gas turbine as claimed in claim 13, further comprising means for sensing at least one of a temperature, pressure or fluid flow,
   a servomechanism connected to said recirculating means, and
   means for coupling said means for sensing and said servomechanism, said sensing means operable to communicate a signal to said servomechanism to control said recirculation means and said second coolant fluid flow to said indirect contact chiller.

15. A precooling system for combustion air communicated to a gas turbine as claimed in claim 1, wherein said indirect contact chiller has a coil with at least one tube,
   a plurality of cooling fins mounted on said tube to enhance heat transfer between said air and said phase-changing fluid,
   said precooling system having a longitudinal axis generally parallel to the horizon,
   said coil having an upper end, a lower end, an inlet side and a discharge side in proximity to said gas turbine,
   said coil upper end inclined toward said indirect evaporative chiller and said inlet side from said lower end to define an acute angle to said longitudinal axis, which provides means to collect moisture condensate on said fins at said discharge side to promote gravity flow of condensate from said coil toward said coil inlet side to wet said fins at said coil inlet side and enhance wetted fin-surface coil cooling and reduce the opportunity for secondary entrainment of said condensate in the air communicated to said gas turbine.

* * * * *